United States Patent
Park et al.

(10) Patent No.: US 11,689,968 B2
(45) Date of Patent: Jun. 27, 2023

(54) METHOD AND APPARATUS FOR EXECUTING VIRTUALIZED NETWORK FUNCTION

(71) Applicant: SAMSUNG ELECTRONICS CO., LTD., Suwon-si (KR)

(72) Inventors: Seonjun Park, Suwon-si (KR); Youngsun Seo, Suwon-si (KR); Byonggon Chun, Suwon-si (KR); Jihun Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 113 days.

(21) Appl. No.: 17/184,060

(22) Filed: Feb. 24, 2021

(65) Prior Publication Data

US 2021/0266792 A1    Aug. 26, 2021

(30) Foreign Application Priority Data

Feb. 26, 2020    (KR) .................. 10-2020-0023847

(51) Int. Cl.
*H04W 28/12* (2009.01)
*G06F 9/455* (2018.01)
*H04L 43/0882* (2022.01)

(52) U.S. Cl.
CPC ........ *H04W 28/12* (2013.01); *G06F 9/45558* (2013.01); *H04L 43/0882* (2013.01); *G06F 2009/45595* (2013.01)

(58) Field of Classification Search
CPC ....... H04W 28/12; H04W 4/24; H04W 48/16; G06F 9/45558; G06F 2009/45595;

(Continued)

(56) References Cited

U.S. PATENT DOCUMENTS

| 7,783,880 B2 | 8/2010 | Pinkerton et al. |
| 9,547,824 B2 | 1/2017 | Indeck et al. |

(Continued)

FOREIGN PATENT DOCUMENTS

| KR | 10-1201187 | 11/2012 | |
| WO | 2016/204903 | 12/2016 | |
| WO | WO-2019241171 A1 * | 12/2019 | .......... G06F 11/3409 |

OTHER PUBLICATIONS

Search Report and Written Opinion dated Jun. 9, 2021 in counterpart International Patent Application No. PCT/KR2021/002333.

(Continued)

*Primary Examiner* — Habte Mered
(74) *Attorney, Agent, or Firm* — Nixon & Vanderhye, P.C.

(57) ABSTRACT

Provided is a technology for executing a virtualized network function in a wireless communication system. According to an embodiment of the disclosure, a server may obtain traffic processing information and mobile edge computing (MEC) service usage information regarding user equipments (UEs) that have accessed a plurality of base stations connected to the server, obtain, based on the traffic processing information and the MEC service usage information, information about traffic to occur due to UEs accessing the plurality of base stations and MEC services to be used by the UEs, and determine, based on the obtained information about the traffic and usage of the MEC services, at least one hardware component on which a software component virtualizing a network function in the server is to be executed.

19 Claims, 13 Drawing Sheets

(58) Field of Classification Search
CPC . H04L 43/0882; H04L 43/0876; H04L 43/20; H04L 41/0893; H04L 41/5045; H04L 41/20; H04L 41/5022; H04L 43/16; H04L 67/59; H04M 15/58; H04M 15/62; H04M 15/61
See application file for complete search history.

(56) References Cited

U.S. PATENT DOCUMENTS

| | | | |
|---|---|---|---|
| 9,973,214 | B2 | 5/2018 | Lai et al. |
| 2006/0058940 | A1 | 3/2006 | Kumagai et al. |
| 2016/0212017 | A1* | 7/2016 | Li ................... H04L 41/5048 |
| 2016/0286498 | A1 | 9/2016 | Senarath et al. |
| 2018/0077023 | A1* | 3/2018 | Zhang ............... H04L 41/0806 |
| 2018/0359617 | A1* | 12/2018 | Duan ................. H04M 15/59 |
| 2019/0199613 | A1* | 6/2019 | Jam .................... H04L 43/20 |
| 2019/0364492 | A1* | 11/2019 | Azizi ................. H04W 48/16 |
| 2020/0007460 | A1* | 1/2020 | Guim Bernat ........ G06F 9/5072 |
| 2020/0125389 | A1* | 4/2020 | Palermo .............. G06F 9/5027 |
| 2020/0244544 | A1* | 7/2020 | Poort ................. G06F 9/5066 |

OTHER PUBLICATIONS

Extended European Search Report dated Jul. 23, 2021 in counterpart European Application No. 21159149.0.
Rakovic, V. et al., "Dynamic Virtual Resource Allocation in Virtualized multi-RAT Cellular Networks," Wireless Personal Communications, Springer, vol. 97, No. 2, Jun. 8, 2017, pp. 1677-1692.
Garcia-Saavedra, A. et al., "Joint Optimization of Edge Computing Architectures and Radio Access Networks," IEEE Journal on Selected Areas in Communications, vol. 36, No. 11, Nov. 1, 2018, pp. 2433-2443.

\* cited by examiner

FIG. 6
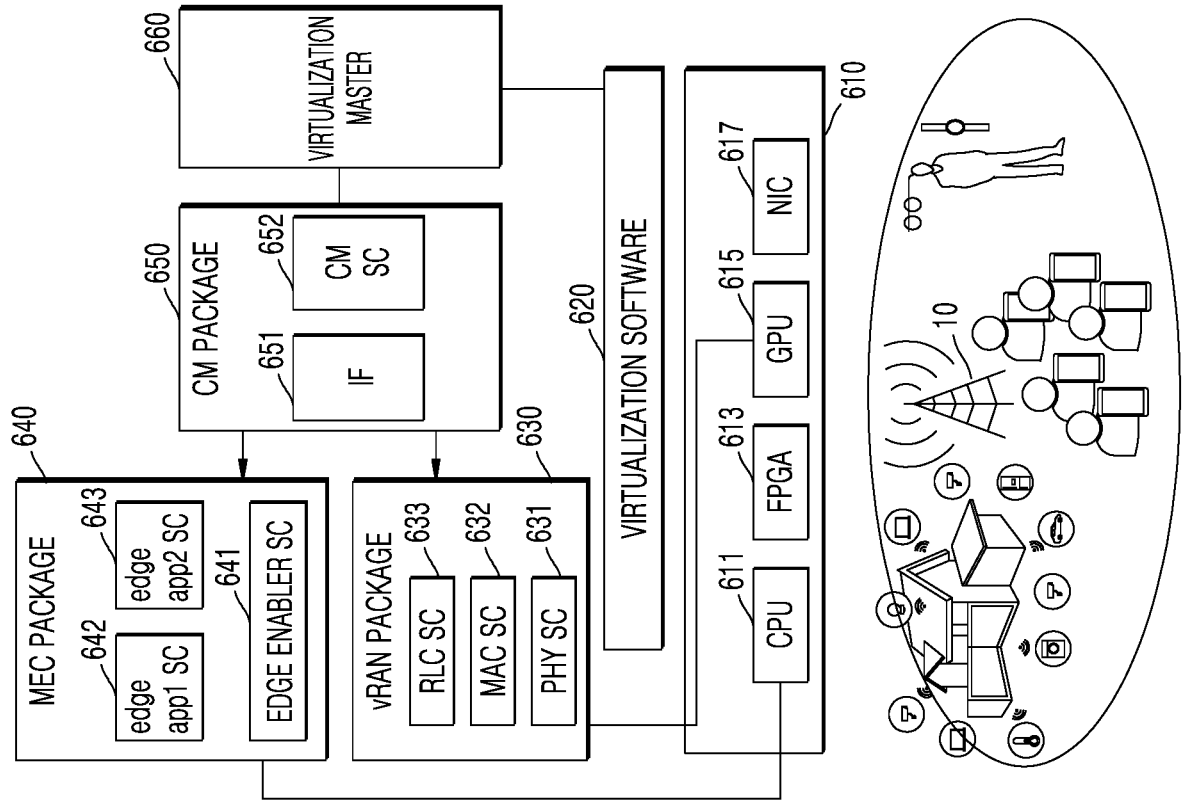
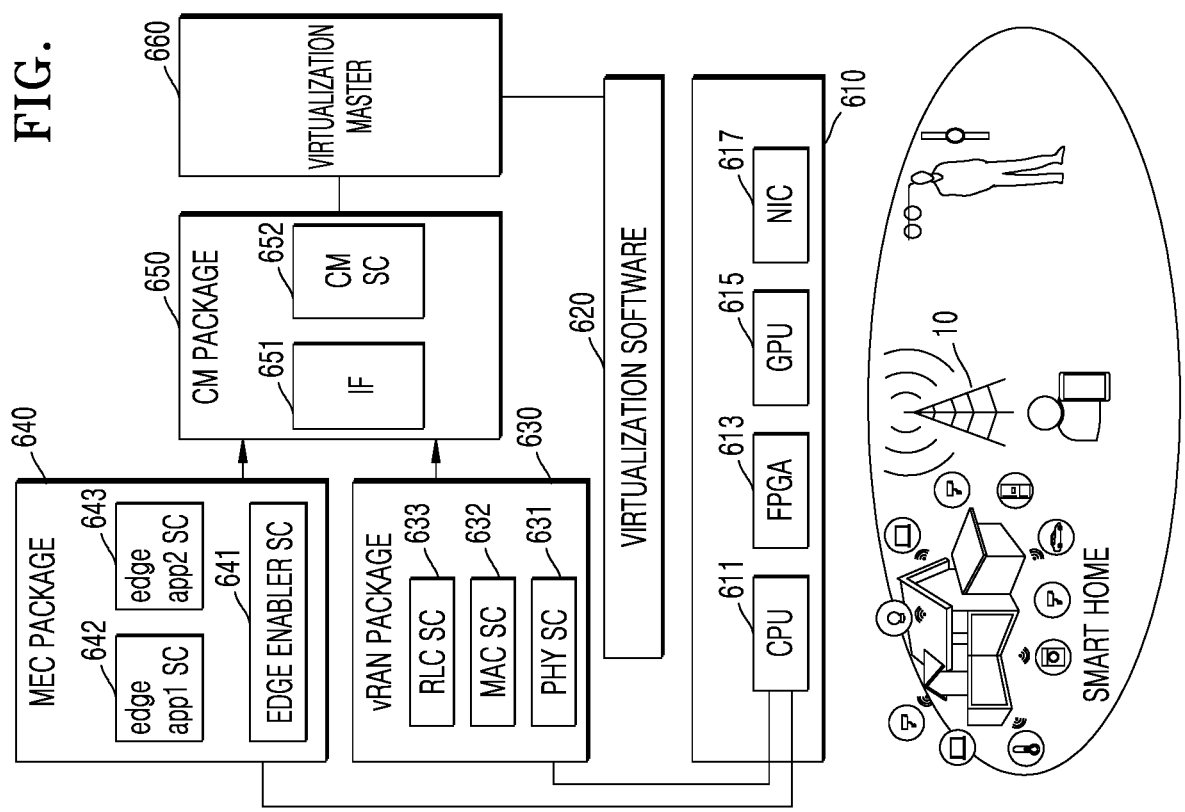

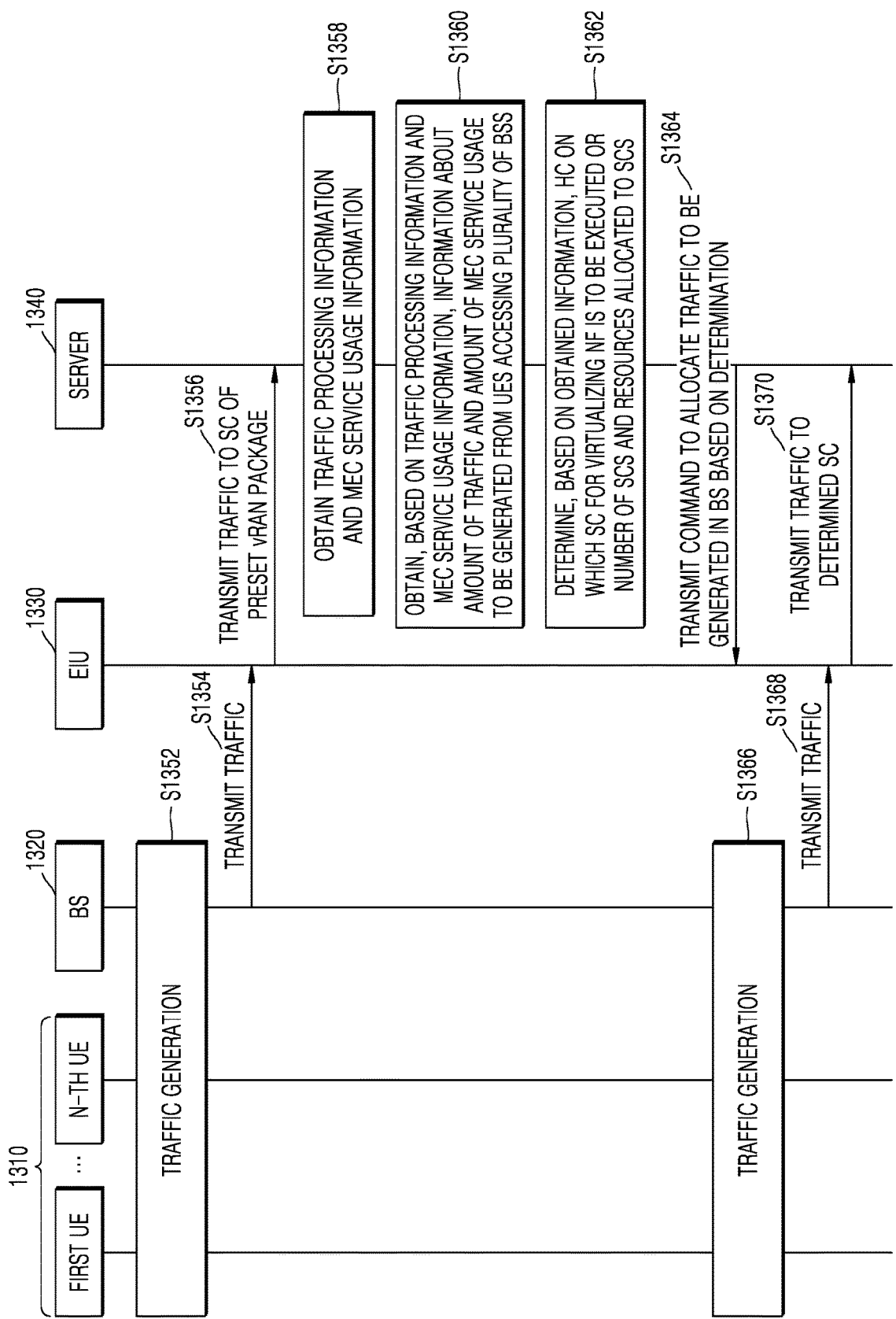

METHOD AND APPARATUS FOR EXECUTING VIRTUALIZED NETWORK FUNCTION

CROSS-REFERENCE TO RELATED APPLICATION

This application is based on and claims priority under 35 U.S.C. § 119 to Korean Patent Application No. 10-2020-0023847, filed on Feb. 26, 2020, in the Korean Intellectual Property Office, the disclosure of which is incorporated by reference herein in its entirety.

BACKGROUND

1. Field

The disclosure relates to a method and apparatus for executing a virtualized network function.

2. Description of Related Art

Efforts have been made to develop an improved 5th generation (5G) communication system or pre-5G communication system to keep up with growing wireless data traffic demand after the commercialization of 4th generation (4G) communication systems. For this reason, the 5G or pre-5G communication system is called a beyond 4G network communication system or a post long-term evolution (LTE) system.

To improve system networks for 5G communication systems, various technologies including evolved small cells, advanced small cells, cloud radio access network (RAN), ultra-dense networks, device to device (D2D) communication, wireless backhaul, moving networks, cooperative communication, coordinated multi-points (CoMP), and interference cancellation are currently being developed.

Moreover, the Internet has evolved from a human-centered connection network, in which humans create and consume information, to an Internet of Things (IoT) network in which dispersed components such as objects exchange information with one another to process the information. Internet of Everything (IoE) technology has emerged, in which the IoT technology is combined with, for example, a technology for processing big data through connection with a cloud server or the like. In an IoT environment, intelligent Internet technology services may be provided to create new values for human life by collecting and analyzing data obtained from interconnected objects. The IoT may be applied to various fields such as smart homes, smart buildings, smart cities, smart cars or connected cars, a smart grid, health care, smart home appliances, advanced medical services, etc., through convergence and integration between existing information technology (IT) and various industries.

Thus, various attempts are being made to apply a 5G communication system to the IoT network. For example, 5G communication technologies, such as sensor networks, machine to machine (M2M) communication, machine-type communication (MTC), etc., are implemented using techniques such as beamforming, multiple-input multiple-output (MIMO), array antennas, etc. The application of a cloud RAN as the above-described big data processing technology is also an example of convergence between the 5G and IoT technologies.

As various technologies may be applied due to advances in wireless communication systems and the aforementioned techniques, there is a need for a method for efficiently managing a RAN through these various technologies.

SUMMARY

Embodiments of the disclosure provide a method and apparatus for executing a virtualized network function in preparation for a change in the amount of traffic or service usage, which occurs in a wireless communication system.

Additional aspects will be set forth in part in the description which follows and, in part, will be apparent from the description.

According to an example embodiment of the disclosure, a method, performed by a server, of executing a virtualized network function in a wireless communication system includes: obtaining traffic processing information and mobile edge computing (MEC) service usage information regarding a plurality of user equipments (UEs) that have accessed a plurality of base stations connected to the server; obtaining, based on the traffic processing information and the MEC service usage information, information about traffic to occur due to UEs accessing the plurality of base stations and MEC services to be used by the UEs; and determining, based on the obtained information about the traffic and usage of the MEC services, at least one hardware component on which a software component virtualizing a network function in the server is to be executed.

The obtaining of the information about the traffic to occur due to the UEs and the MEC services to be used by the UEs may include: identifying, based on the traffic processing information and the MEC service usage information, the amount of traffic processed and the amount of MEC service usage for each preset time unit; and predicting, based on the amount of the processed traffic and the amount of MEC service usage, which are identified for each preset time unit, the amount of traffic and the amount of MEC service usage to be generated by the UEs at a particular time point.

The determining of the at least one hardware component may include: comparing each of the amount of traffic and the amount of MEC service usage to be generated by the UEs at the particular time point with at least one preset threshold; and determining, based on a result of the comparing, a hardware component on which each of a virtualized random access network (vRAN) package and a MEC package, which includes the software component virtualizing the network function, is to be executed.

The determining of the at least one hardware component may include: based on a same hardware component being determined for each of the vRAN package and the MEC package, determining priorities of the vRAN package and the MEC package based on required performance in the wireless communication system; and determining, based on the determined priorities, a hardware component on which the vRAN package or the MEC package is to be executed.

The determining of the at least one hardware component may include, based on a hardware component determined for each of the vRAN package and the MEC package being a virtualized hardware component, determining, based on the priorities, a ratio of the hardware component in which each of the vRAN package or the MEC package is to be executed.

The determining of the at least one hardware component may include: based on at least one of the amount of traffic or the amount of MEC service usage to be generated by the UEs being in a first range, determining that a hardware component on which the software component is to be executed is a graphics processing unit (GPU); and based on at least one of the amount of traffic or the amount of MEC service usage to be generated by the UEs being in a second range, determining that a hardware component on which the software component is to be executed is a field programmable gate array (FPGA).

The method may further include, based on at least one of the amount of traffic or the amount of MEC service usage to be generated by the UEs at a particular time point being identified to exceed a threshold, performing hardware offloading before the particular time point so that the software component executed on a first hardware component is to be executed on a second hardware component.

The method may further include obtaining information about an event causing a change in traffic or MEC service usage, which is expected to occur in the plurality of base stations, and the obtaining of the information about the traffic to occur due to the UEs and the MEC services to be used by the UEs may include: identifying the amount of traffic and the amount of MEC service usage previously generated in the plurality of base stations for each event; and determining, based on the identified amount of traffic and amount of MEC service usage previously generated for each event, the amount of traffic and the amount of MEC service usage to be generated in the plurality of base stations according to the obtained event information.

The at least one hardware component may include at least one of a central processing unit (CPU), a GPU, an FPGA, or a network interface controller (NIC).

According to an example embodiment of the disclosure, a server for executing a virtualized network function in a wireless communication system includes: a memory storing one or more instructions; and at least one processor configured to execute the one or more instructions stored in the memory to: obtain traffic processing information and MEC service usage information regarding UEs that have accessed a plurality of base stations connected to the server; obtain, based on the traffic processing information and the MEC service usage information, information about traffic to occur due to UEs accessing the plurality of base stations and MEC services to be used by the UEs; and determine, based on the obtained information about the traffic and usage of the MEC services, at least one hardware component on which a software component virtualizing a network function in the server is to be executed.

According to an example embodiment of the disclosure, a computer program product includes a non-transitory computer-readable recording medium having stored thereon a program which, when executed, causes a server to perform operations of executing a virtualized network function, the operations including: obtaining traffic processing information and MEC service usage information regarding a plurality of UEs that have accessed a plurality of base stations connected to the server; obtaining, based on the traffic processing information and the MEC service usage information, information about traffic to occur due to UEs accessing the plurality of base stations and MEC services to be used by the UEs; and determining, based on the obtained information about the traffic and usage of the MEC services, at least one hardware component on which a software component virtualizing a network function in the server is to be executed.

BRIEF DESCRIPTION OF THE DRAWINGS

The above and other aspects, features, and advantages of certain embodiments of the disclosure will be more apparent from the following detailed description, taken in conjunction with the accompanying drawings, in which:

FIG. 6 is a diagram illustrating an example method, performed by a server, of determining a hardware component (HC) on which a software component (SC) for performing a virtualized RAN (vRAN) function is to be executed as the amount of traffic is expected to increase, according to various embodiments;

FIG. 13 is a signal flow diagram illustrating example operations of a server for processing traffic between a plurality of user equipments (UEs) and a base station (BS) via SC adjustment, according to various embodiments.

DETAILED DESCRIPTION

Figure 1:
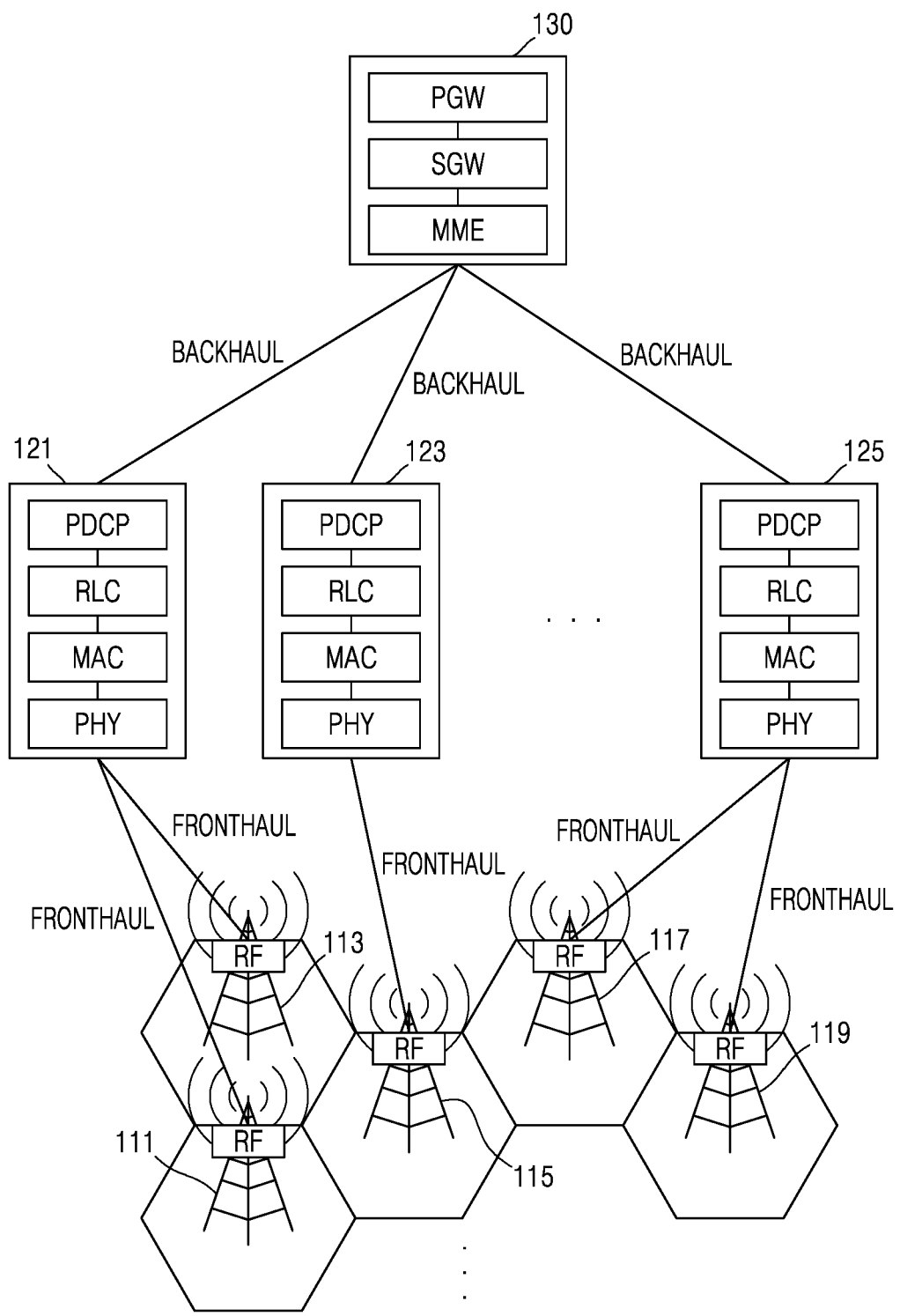
FIG. 1 is a diagram illustrating an example architecture of a centralized/cloud radio access network (cRAN) according to various embodiments.

Hereinafter, various example embodiments of the disclosure will be described in greater detail with reference to the accompanying drawings. In the following disclosure, descriptions of technical features that are well known in the art to which the disclosure pertains and are not directly related to the disclosure may be omitted. This is for clearly describing the disclosure without obscuring it by including unnecessary descriptions.

In the accompanying drawings, some components are exaggerated, omitted, or schematically illustrated. Furthermore, the size of each element may not entirely reflect an actual size thereof. In the drawings, the same reference numerals refer to the same or corresponding elements throughout.

Advantages and features of the disclosure and methods of accomplishing the same will be more readily appreciated by referring to the following description of embodiments of the disclosure and the accompanying drawings. However, the disclosure should not be construed as being limited to embodiments of the disclosure set forth below but may be embodied in many different forms. Rather, the various example embodiments of the disclosure are provided so that the disclosure will convey the concept of the disclosure to those of ordinary skill in the art. Throughout the disclosure, like reference numerals refer to like elements.

It will be understood that combinations of blocks in process flow diagrams and flowcharts in the drawings may be performed by computer program instructions. These computer program instructions may be loaded into a processor of a general-purpose computer, special-purpose computer, or another programmable data processing equipment, and thus, the instructions performed via the processor of the computer or the other programmable data processing equipment create a means for performing functions specified in the flowchart block(s). The computer program instructions may also be stored in a computer-executable or computer-readable memory capable of directing the computer or the other programmable data processing equipment to implement functions in a particular manner, and thus, the instructions stored in the computer-executable or computer-readable memory are capable of producing items including instruction means for performing the functions described in the flowchart block(s). The computer program instructions may also be loaded into the computer or the other programmable data processing equipment, and thus, instructions for operating the computer or the other programmable data processing equipment by generating a computer-executed process when a series of operations are performed in the computer or the other programmable data processing equipment may provide operations for performing the functions described in the flowchart block(s).

In addition, each block may represent a portion of a module, segment, or code that includes one or more executable instructions for executing specified logical function(s). It is also noted that, in some alternative implementations, functions described in blocks may occur out of order. For example, two blocks illustrated in succession may be executed substantially simultaneously, or the blocks may sometimes be executed in reverse order depending on functions corresponding thereto.

As used herein, the term 'unit' may refer, for example, to a software element or a hardware element such as a field-programmable gate array (FPGA) or an application-specific integrated circuit (ASIC), or any combination thereof, and performs certain functions. However, the term 'unit' is not limited to software or hardware. The 'unit' may be configured to be in an addressable storage medium or configured to operate one or more processors. Thus, the term 'unit' may include, for example, elements such as software elements, object-oriented software elements, class elements, and task elements, processes, functions, attributes, procedures, sub-routines, segments of program code, drivers, firmware, micro-codes, circuits, data, a database, data structures, tables, arrays, and variables. Functions provided by the elements and the 'units' may be combined into a smaller number of elements and 'units', or may be further divided into a larger number of elements and 'units'. Furthermore, the elements and 'units' may be embodied to reproduce one or more central processing units (CPUs) in a device or security multimedia card. In addition, in an embodiment, the 'unit' may include one or more processors.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the disclosure, a layer (or a layer apparatus) may also be referred to as an entity.

Wireless communication systems have progressed beyond providing initial voice-centered services into broadband wireless communication systems that provide high-speed, high-quality packet data services based on communication standards such as 3rd Generation Partnership Project (3GPP)'s High Speed Packet Access (HSPA), Long Term Evolution (LTE) or Evolved Universal Terrestrial Radio Access (E-UTRA), LTE-Advanced (LTE-A), 3GPP2's High Rate Packet Data (HRPD), Ultra Mobile Broadband (UMB), and IEEE's 802.16e. Furthermore, 5G or new radio (NR) wireless communication systems are being developed as next-generation wireless communication systems.

In the next-generation wireless communication systems, at least one of an enhanced mobile broadband (eMBB) service, a massive machine type communications (mMTC) service, or an ultra-reliable and low-latency communications (URLLC) service may be provided to a UE. The above-described services may be provided to the same or different UEs during the same time period. The eMBB service may aim at high-speed transmission of high-capacity data, the mMTC service may aim to minimize UE power consumption and provide connectivity to multiple UEs, and the URLLC service may aim at achieving high reliability with low latency, but are not limited thereto. Furthermore, the three services may be fundamental scenarios for wireless communication systems such as LTE systems or post-LTE 5G/NR (next radio) systems.

Hereinafter, for convenience of description, the disclosure uses terms and names defined in the 3GPP LTE specifications or terms and names modified based on the defined terms and names. However, the disclosure is not limited to the terms and names but may also be applied identically or similarly to systems that comply with other standards. For example, although an embodiment of the disclosure is described by taking a 5G NR (next radio) system as an example, embodiments of the disclosure may also be applied to other communication systems having similar technical backgrounds and channel configurations. As another example, an embodiment of the disclosure may be applied to an LTE or LTE-A wireless communication system developed before an NR system, and embodiments of the disclosure may also be applied to a wireless communication system developed after the NR system. Furthermore, it will be understood by those skilled in the art that embodiments of the disclosure are applicable to other wireless communication systems through modifications without significantly departing from the scope of the disclosure.

As used in the following description, terms indicating access nodes, terms indicating network entities, terms indicating messages, terms indicating interfaces between network entities, terms indicating various types of identification information, etc. are exemplified for convenience of description. Accordingly, the disclosure is not limited to terms to be described later, and other terms representing objects having equivalent technical meaning may be used.

In the disclosure, a base station (BS) may refer, for example, to an entity that allocates resources to a UE, and may be at least one of a gNode B, an eNode B, a Node B, a BS, a radio access unit, a BS controller, or a network node.

In the disclosure, a cell may refer, for example, to a geographical area covered by a BS in wireless communication. Cells may be classified into mega cells, macro cells, micro cells, and pico cells according to their size, but this is merely an example, and the type of cells is not limited thereto.

In the disclosure, a downlink (DL) may refer, for example, to a radio link through which a BS transmits a signal to a UE, and an uplink (UL) may refer, for example, to a radio link through which the UE transmits a signal to the BS. In more detail, as a representative example of a broadband wireless communication system, an LTE system adopts an orthogonal frequency division multiplexing (OFDM) scheme for a downlink while employing a single carrier frequency division multiple access (SC-FDMA) scheme for an uplink. An uplink may refer, for example, to a radio link through which a UE (or terminal) or a mobile station (MS) transmits data or a control signal to gNode B or BS, and a downlink may refer, for example, to a radio link through which the BS transmits data or a control signal to the UE.

FIG. 1 is a diagram illustrating an example architecture of a centralized/cloud radio access network (cRAN) according to various embodiments.

Referring to FIG. 1, in the cRAN, an existing BS is separated into a radio unit (RU) and a data unit (DU), and the RU may be located in a BS (e.g., 111) at a cell site while the DU (e.g., 121) may be located at a central server. A cell corresponds to a geographical area covered by a BS in a wireless communication system, and at least one cell may exist for each BS. Unlike in an integrated BS where both the RU and DU are located at a cell site, in the cRAN, RUs may be deployed in BSs 111, 113, 115, 117, 119 at a cell site while DUs 121, 123, and 125 may be centralized in a single location to execute at least some RAN functions. The RAN functions will be described in detail later. The cRAN may manage the DUs 121, 123, and 125 in a centralized manner to not only easily adjust interference between cells but also provide services such as coordinated multi-point transmission and reception (CoMP).

Each of the BSs 111, 113, 115, 117, and 119 at the cell site may include a radio frequency (RF) device, etc., and may transmit a signal to a DU (e.g., 121) through a fronthaul. A fronthaul is a portion of a network connecting the BSs (e.g., 111 and 113) at the cell site to the DU (e.g., 121) and may perform functions such as digital signal processing (DSP), power amplification, filtering, etc.

On the other hand, the DU (e.g., 121) may process a signal received from the BS (e.g., 111) at the cell site and transmit the processed signal to a core network device 130 through a backhaul. The core network device 130 may include devices that connect an end-to-end system composed of a BS and a UE. For example, the core network device 130 may include a packet data network gateway (P-GW), a serving gateway (S-GW), a mobile management entity (MME), etc. The P-GW may connect an internal node of a core network to an external Internet, configure an Internet Protocol (IP) address for a UE, and perform IP packet filtering. Furthermore, the S-GW may buffer DL packets arriving from the external Internet when a radio resource control (RRC) connection is not established in the UE. The MME may process control signals related to UE location registration, authentication, and calls. However, these operations are merely examples, and the configuration of the core network device 130 is not limited to these examples.

A backhaul is a portion of a network connecting the DU (e.g., 121) to the core network device 130 and may be implemented as a wired interface such as an optical fiber. However, this is merely an example, and the backhaul may also be implemented as a wireless network.

The DU (e.g., 121) may perform various RAN functions for signal processing. For example, the RAN functions may include functions of a packet data convergence protocol (PDCP) layer, functions of a radio link control (RLC) layer, functions of a medium access control (MAC) layer, functions of a physical (PHY) layer, etc. However, this is merely an example, and the RAN functions are not limited to the above-described example. The functions of a PDCP layer, an RLC layer, a MAC layer, and a PHY layer are now described in detail.

The functions of the PDCP layer may include at least some of the following functions:
  Header compression and decompression (robust header compression (ROHC) only)
  Transfer of user data
  In-sequence delivery of upper layer packet data units (PDUs)
  PDCP PDU reordering
  Duplicate detection of lower layer service data units (SDUs)
  Retransmission of PDCP SDUs
  Ciphering and deciphering
  Timer-based SDU discard in uplink The reordering function of the PDCP layer refers to a function of sequentially reordering PDCP PDUs received from a lower layer based on a PDCP sequence number (SN) and may include at least one of a function of transferring data to an upper layer in a rearranged order, a function of sequentially reordering PDCP PDUs and recording missing PDCP PDUs, a function of submitting a status report for missing PDCP PDUs to a transmitting side, or a function of requesting retransmission of missing PDCP PDUs.

The functions of the RLC layer may include at least some of the following functions:
  Transfer of upper layer PDUs
  In-sequence delivery of upper layer PDUs
  Out-of-sequence delivery of upper layer PDUs
  Error correction through automatic repeat request (ARQ)
  Concatenation, segmentation and reassembly of RLC SDUs
  Re-segmentation of RLC data
  Reordering of RLC data
  Duplicate detection
  Protocol error detection
  RLC SDU discard
  RLC re-establishment The in-sequence delivery function of the RLC layer refers to a function of sequentially transferring RLC SDUs received from a lower layer to an upper layer and may include a function of, when one RLC SDU is segmented into multiple RLC SDUs and received, reassembling and transferring the multiple RLC SDUs. Furthermore, the in-sequence delivery function may include at least one of a function of reordering received RLC PDUs based on an RLC SN or a PDCP SN, a function of sequentially reordering RLC PDUs and recording missing RLC PDUs, or a function of submitting a status report for missing RLC PDUs to a transmitting side. Furthermore, the in-sequence delivery function may include a function of requesting retransmission of the missing RLC PDUs and a function of sequentially transferring, when there is a missing RLC SDU, only RLC SDUs preceding the missing RLC SDU to an upper layer. In addition, the in-sequence delivery function may include a function of sequentially transferring all RLC SDUs received before a given timer restarts to a upper layer when the timer expires even before a missing RLC SDU is received, or a function of sequentially transferring, to the upper layer, all RLC SDUs received up to a current time point when the given timer expires before the missing RLC SDU is received.

The RLC layer may process RLC PDUs in an order that the RLC PDUs are received and transfer the RLC PDUs to the PDCP layer, regardless of the order of SNs. When segments of RLC SDUs are received, the RLC layer may concatenate the segments of RLC SDUs with segments stored in a buffer or segments to be subsequently received to create a single complete RLC PDU and then transfer the RLC PDU to the PDCP layer. In NR, the RLC layer may not include a concatenation function, and the concatenation function may be performed at the MAC layer or be replaced with a multiplexing function of the MAC layer.

The functions of the MAC layer may include at least some of the following functions:

Mapping between logical channels and transport channels
Multiplexing/demultiplexing of the MAC SDUs
Scheduling information reporting
Error correction through hybrid ARQ (HARQ)
Priority handling between logical channels of one UE
Priority handling between UEs by means of dynamic scheduling
Multimedia broadcast/multicast service (MBMS) service identification
Transport format selection
Padding The PHY layer may perform at least some of the following functions:
Data transmission and reception using electrical signals
Channel coding/decoding
Modulation/demodulation
Power control
Cell search The PHY layer may perform channel coding and modulation on upper-layer data to generate OFDM symbols and transmit the OFDM symbols via a radio channel. The PHY layer may also perform demodulation and channel decoding on OFDM symbols received via a radio channel and transfer data obtained as a result of the demodulation and channel decoding to an upper layer.

However, the RAN functions are not limited to the above-described example and may include functions of an RRC layer. An example of the functions of the RRC layer is as follows:

Broadcast of necessary cell system information to all UEs in cell
Delivery and management of paging messages
Management of RRC connection between wireless UE and evolved-Universal Mobile Telecommunication systems (UMTS) terrestrial Radio access network (E-UTRAN) (establishment/maintenance/release)
UE context transfer between eNodeBs at handover
Establishment, reconfiguration, and release of radio bearers
UE measurement reporting and control of reporting
UE capability management: temporary allocation of cell ID to UE
Security management including key management: RRC message ciphering, etc.

Moreover, a term such as a RU or remote radio head (RRH) may be used to describe the BS (e.g., 111) at the cell site, and a term such as a DU or base band unit (BBU) may be used to describe the DU (e.g., 121).

To manage the DUs 121, 123, and 125 that perform the above-described RAN functions in a centralized manner, there is a need for a method capable of efficiently using physical resources required for data processing. For this purpose, the disclosure describes example methods of executing, via virtualization, at least one RAN function performed by the DUs 121, 123, and 125. Virtualization is a technology capable of expanding resources available on one device by consolidating multiple physical resources for management. Hereinafter, examples of a virtualized RAN (vRAN) according to the disclosure will be described in detail with reference to FIGS. 2 and 3.

Figure 2:
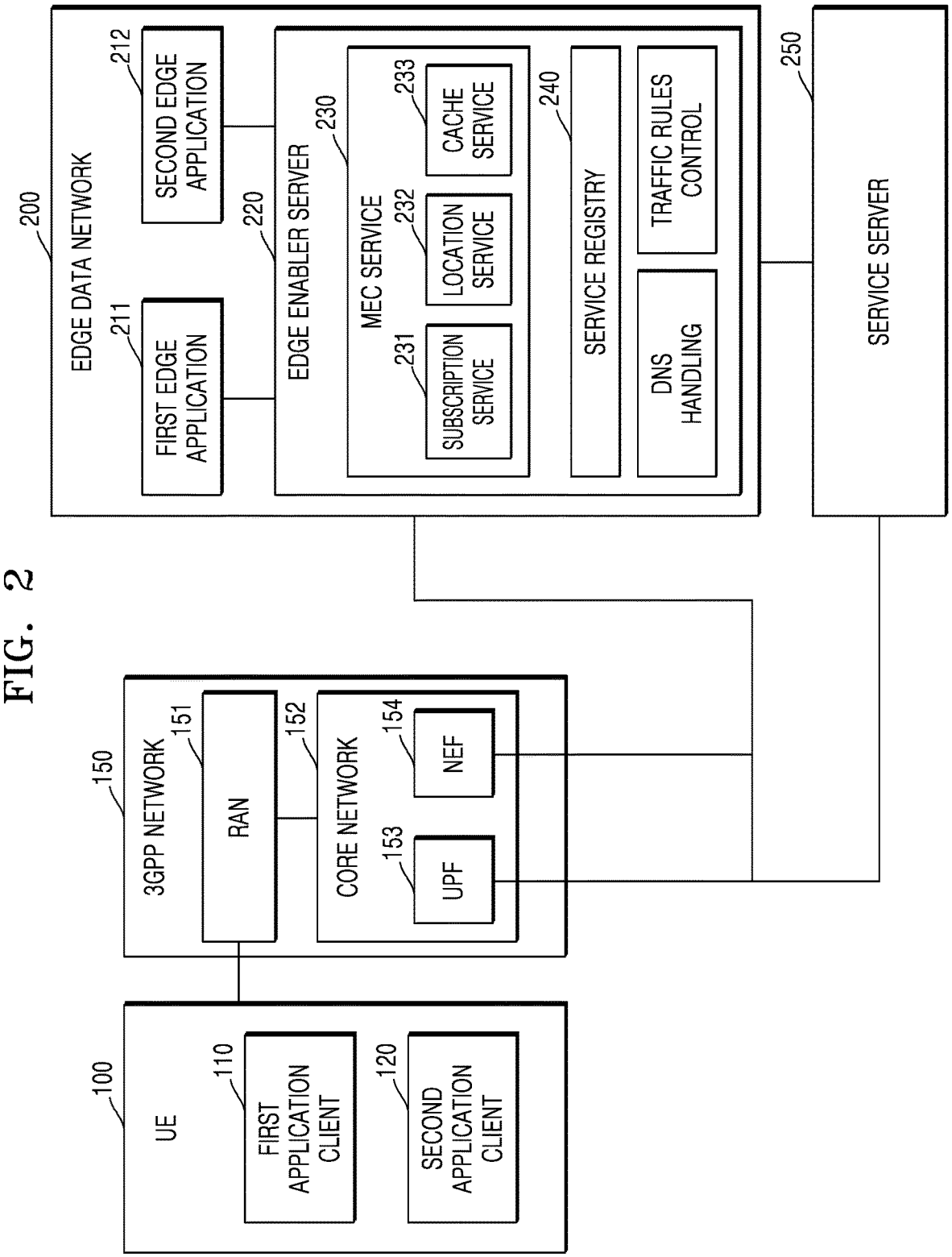
FIG. 2 is a diagram illustrating an example network environment for supporting mobile edge computing (MEC)-based services according to various embodiments.

FIG. 2 is a diagram illustrating an example network environment for supporting mobile edge computing (MEC)-based services according to various embodiments.

According to an example embodiment, a UE 100 may include a first application client 110 and a second application client 120. The UE 100 may be connected to a 3GPP network 150 to transmit and receive data related to the first and second application clients 110 and 120.

The 3GPP network 150 may include a RAN 151 and a core network 152, and the core network 152 may include a user plane function (UPF) 153 and a network exposure function (NEF) 154. However, these are merely examples of network functions (NFs) constituting the core network 152, and the configuration of the core network 152 is not limited thereto.

The 3GPP network 150 may be connected to an edge data network 200 to transmit and receive data related to MEC services 230. Furthermore, the UPF 153 may provide a data path (or data plane) between the UE 100 and either the edge data network 200 or a service server 250. In other words, the UPF 153 may act as a gateway for delivering data (or data packets) transmitted and received by the UE 100.

The edge data network 200 may provide the MEC services 230 to the UE 100. To do so, the edge data network 200 may be located inside a BS of the 3GPP network 150 to which the UE 100 is connected or at a location geographically close to the BS and provide content at least a part of which is the same as content provided by the service server 250. According to an example embodiment, the edge data network 200 may include a plurality of edge applications, i.e., first and second edge applications 211 and 212, and an edge enabler server 220. However, this configuration is merely an example, and the configuration of the edge data network 200 is not limited thereto.

An edge application is an application provided by a third party in the edge data network 200 and may establish a data session with an application client to transmit and receive data related to the application client.

According to various example embodiments, the edge enabler server 220 may provide a function required to execute the first or second edge application 211 or 212. For example, the edge enabler server 220 may provide a function or environment so that the first or second edge application 211 or 212 may provide the MEC services 230 to the UE 100 or the like or consume the MEC services 230. Hereinafter, the MEC services 230 may refer, for example, to services provided by the edge data network 200 or the first or second edge application 211 or 212 to the UE 100, or services that are consumable by the edge application.

Moreover, the edge enabler server 220 may include the MEC services 230 and a service registry 240. The MEC services 230 may provide services to the first and second edge applications 211 and 212 included in the edge data network 200. The MEC services 230 may be implemented as software or modules capable of performing individual functions. The service registry 240 may provide information about services available on the edge data network 200.

According to various example embodiments, the first or second edge application 211 or 212 may subscribe to the MEC services 230 registered with the service registry 240. When the first or second edge application 211 or 212 subscribes to the MEC services 230, it may be understood that the corresponding application continuously receives the MEC services 230 or information about the MEC services 230 from the edge enabler server 220. By subscribing to the MEC services 230 registered with the service registry 240, the first or second edge application 211 or 212 may receive the MEC services 230 from the edge enabler server 220 to consume the MEC services 230 and provide them to the UE 100.

According to various example embodiments, the MEC services 230 may include various services that are to be provided to the first or second edge application 211 or 212. For example, the MEC services 230 may include a subscription service 231, a location service 232, a cache service 233, etc. that are to be provided to the first or second edge application 211 or 212.

The subscription service 231 may, for example, provide information about an event to the 3GPP network 150 or receive information about an event from the 3GPP network 150. Events may include, for example, an event related to a change in the amount of traffic or usage of services for the UE 100, an event related to a location of the UE 100 (e.g., a current location of the UE 100, a change of its location, a location of the UE 100 in a particular situation, etc.), disconnection of the UE 100, an access by the UE 100, a change in a roaming status of the UE 100, a communication failure, etc.

The location service 232 may, for example, provide information on the location of the UE 100 and a service based on information on the location of the UE 100. The location service 232 may provide information about a location of the UE 100, which is obtained via the 3GPP network 150. The information on the location of the UE 100 may include Global Positioning System (GPS) information of the UE 100, a region where the UE 100 is located, information about a path along which the UE 100 moves, information about a cell connected to (or camped on by) the UE 100, a cell to which the UE 100 is to be handed over, etc., and include any information related to the location of the UE 100 without being limited to the above examples.

The cache service 233 may provide data by caching the data from the service server 250. Caching may refer, for example, to a technology for providing data at low latency in response to a request for the data by obtaining data in advance from a server that provides data before the request for the data is made. In the disclosure, caching may refer to a series of processes of storing data provided by the service server 250 in advance by requesting the data from the service server 250 before the UE 100 or the first or second application client 110 or 120 sends a request for the data. The edge data network 200 may store data to be provided to the UE 100 therein in advance rather than in the service server 250 because it is located closer to the UE 100, thereby reducing network transmission delay.

The service server 250 may provide content related to applications (e.g., an application client and an edge application). For example, the service server 250 may be managed by a content provider that provides content to the UE 100. The edge data network 200 may transmit or receive data for providing MEC services to or from the service server 250 and cache data from the service server 250 in advance.

Figure 3:
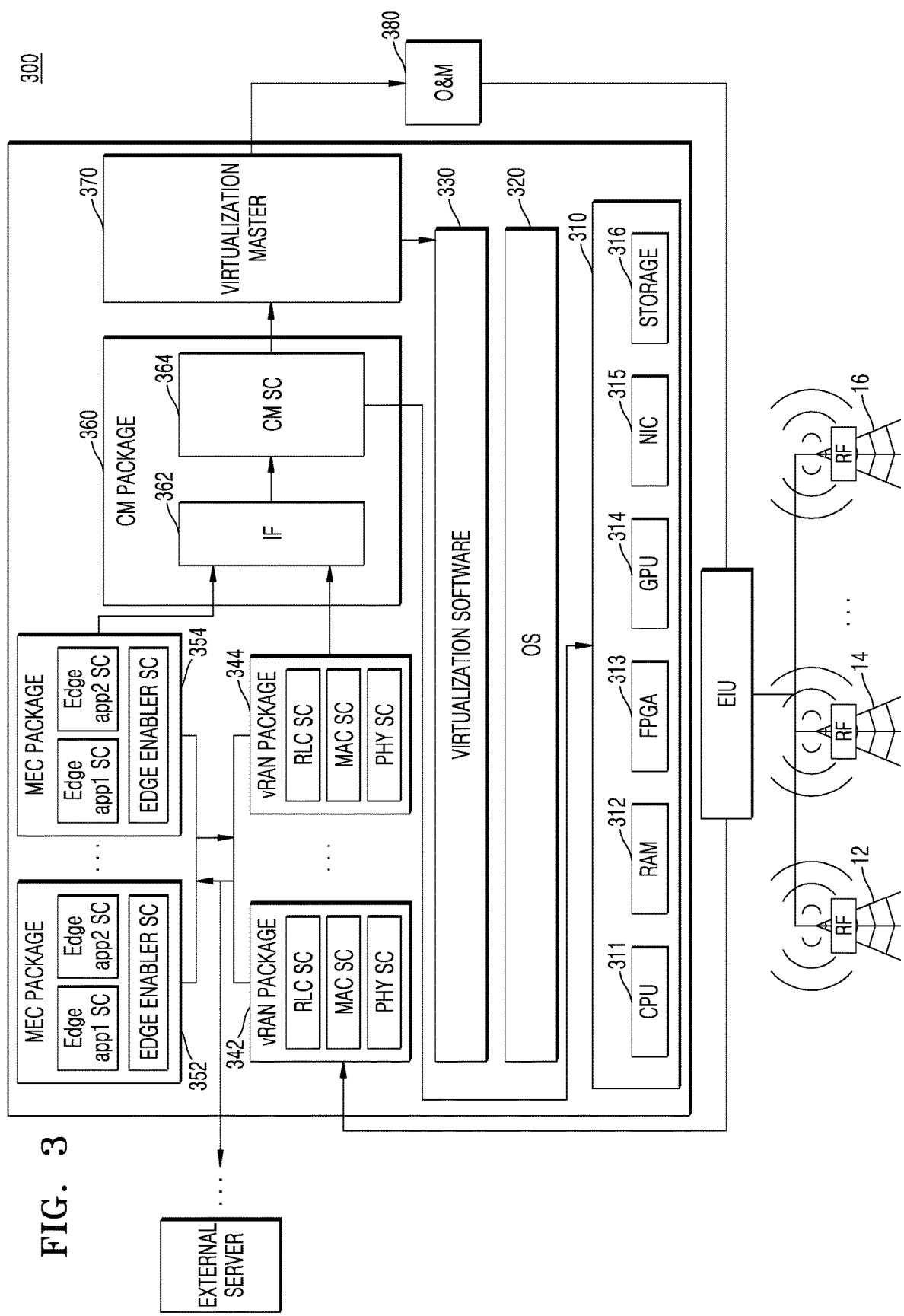
FIG. 3 is a block diagram illustrating an example configuration of a server for executing a virtualized network function (VNF) according to various embodiments.

FIG. 3 is a block diagram illustrating an example configuration of a server 300 for executing a virtualized NF (VNF) according to various embodiments.

Referring to FIG. 3, the server 300 may include hardware 310 capable of driving software for executing a VNF. The hardware 310 may include a CPU 311, a random access memory (RAM) 312, an FPGA 313, a graphics processing unit (GPU) 314, a network interface controller (NIC) 315, and a storage 316, but this is merely an example configuration, and components of the hardware 310 are not limited thereto. Furthermore, the storage 316 may include a hard disk drive (HDD), a solid state drive (SDD), etc.

An operating system (OS) 320 may be run on the hardware 310. The OS 320 may manage the hardware 310 and software (e.g., a virtualization software 330) executed on the server 300.

The virtualization software 330 may logically partition resources managed by the OS 320 into multiple resources that are to be shared among multiple software components (SCs). A resource is an item used to process traffic in a vRAN package (e.g., 342). For example, the resources may include the CPU 311, the RAM 313, the GPU 317, etc., but this is merely an example, and the resources are not limited thereto. The resources may be logically partitioned by distributing a physical communication line connecting the resources to a plurality of SCs via a switch. An SC may be designed to act like a separate server by grouping libraries or applications required to perform a particular function and may be created or removed on a package-by-package basis. A package is the smallest unit capable of accommodating one or more SCs while sharing a single IP address. Examples of the virtualization software 330 may include Kubernetes software, and an SC may correspond to a container on the Kubernetes software.

Moreover, according to various embodiments, an SC may be used to perform an NF. According to various embodiments, an NF is a function of transferring traffic between devices on a network and processing generated traffic, and may include, for example, a RAN function and a MEC function. The RAN function may correspond to the RAN functions described above with reference to FIG. 1, and the MEC function may correspond to the functions of the edge data network 200 described above with reference to FIG. 2. Furthermore, in this disclosure, a component of hardware on which an SC for virtualizing an NF is to be executed is described by way of example as a hardware component (HC).

According to various embodiments, the server 300 may determine at least one HC on which an SC for virtualizing an NF is to be executed. In addition, the server 300 may perform offloading, which is an operation of shifting a task of processing an NF so that an SC that was previously executed on a particular HC may be executed on another HC. For example, the server 300 may shift vRAN functions and MEC functions processed by HCs such as the CPU 311, the RAM 312, and the storage 316 to other HCs such as the GPU 314 and the FPGA 313 for processing. As another example, the server 300 may change an HC on which an SC is executed based on the amount of vRAN traffic and amount of MEC service usage to be generated on the network. In this disclosure, all of the above-described operations may be included in the category of offloading. An offloading operation of the server 300 is now described in more detail.

The server 300 may be connected to a plurality of BSs 12, 14, and 16 at a cell site through an Ethernet interface unit (EIU) 50. The EIU 50 is a part of a passage connecting the server 300 to the BSs 12, 14, and 16 at the cell site, and, for example, traffic of the BSs 12, 14, and 16 may be transmitted to the vRAN package (e.g., 342) via the EIU 50. Furthermore, according to another example, information about the vRAN package (e.g., 342) to which the BSs 12, 14, and 16 at the cell site are allocated may be transmitted to the BSs 12, 14, and 16 via the EIU 50.

According to various embodiments, the server 300 may perform at least some of the RAN functions that were previously performed by a BS. For example, the RAN functions may include PDCP layer functions, RLC layer functions, MAC layer functions, PHY layer functions, etc. However, these are merely examples, and the RAN functions are not limited thereto. Hereinafter, the functions of a PDCP layer, an RLC layer, a MAC layer, and a PHY layer will be described in more detail.

Each of the BSs 12, 14, and 16 at the cell site may have a wireless transceiver including an RF device, and the other RAN functions may be performed by the server 300. For example, a PHY SC, a MAC SC, and an RLC SC may be created in the server 300 and respectively perform the PHY layer functions, the MAC layer functions, and the RLC layer functions. However, these are merely examples, and the RAN functions performed by the server 300 are not limited thereto.

According to various embodiments, the PHY SC, MAC SC, and RLC SC may be included in the vRAN package (e.g., 342). The vRAN package (e.g., 342) is the smallest unit capable of accommodating one or more SCs for perform RAN functions. The vRAN package (e.g., 342) may include instructions that enable virtualization and execution of RAN functions that have been previously performed on a hardware device, and an SC may be removed or created on a per-vRAN package basis.

The vRAN package (e.g., 342) may obtain traffic processing information for traffic generated in the BSs 12, 14, and 16. In this case, traffic is a flow of data passing through a communication network within a certain time. According to various embodiments, the traffic may include a data flow between a UE and the BS (e.g., 12), and may be represented by, for example, a data rate per unit time. Traffic may be generated when the UE connected to the BS (e.g., 12) executes an application. An application refers to an application program running in a device such as a UE for a particular application service, and various applications may be run on the UE. At least one of these applications may use MEC services.

Furthermore, the traffic processing information may includes information about a process of handling traffic according to RAN functions. The traffic processing information may include traffic information regarding a plurality of BSs where traffic is generated and information about resources used for processing the traffic generated in the BSs ("resource information"). The traffic information is information that may directly or indirectly indicate the amount and characteristics of traffic. For example, the traffic information may include a traffic processing speed per cell (e.g., in bits per second (bps)), the number of UEs connected to a BS, a bandwidth allocated to the BS, a frequency sharing ratio between different wireless communication technologies, etc. As another example, the traffic information may include a type of a service that generated the traffic, a frequency band in which the traffic is generated, a type of a wireless communication system (e.g., a NR or LTE system) where the traffic is generated, etc. Furthermore, the resource information may include information that may directly or indirectly indicate a physical resource used for traffic processing. For example, the resource information may include a ratio of CPU cores used for traffic processing to CPU cores assigned to a vRAN package, the number of CPU core clock cycles used for traffic processing compared to the maximum number of CPU core clock cycles, a size of memory allocated to the vRAN package for traffic processing, etc. However, the above examples are merely examples, and the traffic information or resource information is not limited to the above examples.

Moreover, the vRAN package (e.g., 342) may receive the traffic processing information from the BSs 12, 14, and 16 via the EIU 50, and as another example, it may receive the traffic processing information from the OS 320 in the server 300 or another external device. For example, the traffic information included in the traffic processing information may be received from the BSs 12, 14, and 16. Furthermore, the resource information included in the traffic processing information may be received from the OS 320 of the server 300. However, these are merely examples, and the method used by the vRAN package (e.g., 342) to receive the traffic processing information is not limited to the above-described examples. As another example, the traffic processing information may be obtained as a result of applying a statistical method (e.g., a method of calculating a mean, a variance, etc.) to pieces of traffic processing information previously obtained by the vRAN package (e.g., 342). The vRAN package (e.g., 342) may transmit the obtained traffic processing information to a component management (CM) package 360, as described in detail below.

Moreover, among the traffic delivered to the vRAN package 342, traffic generated due to the execution of an application using MEC services may then be delivered to an MEC package (e.g., 352). The MEC package (e.g., 352) may execute an edge application and process traffic generated due to the execution of the edge application or traffic received in relation to the edge application. An edge application may be executed on an edge data network, and the edge data network may be located inside a BS of a 3GPP network to which a UE is connected or at a location geographically close to the BS and provide content at least a part of which is the same as content provided by an external server. Traffic not related to use of the MEC services among the traffic delivered to the vRAN package 342 may be transmitted to another server outside (external to) the server 300 (e.g., external server 386), and a description of a method of processing traffic at the other server outside the server 300 will be omitted herein.

The MEC package (e.g., 352) may provide MEC service usage information to the CM package 360. The MEC service usage information includes information about a service provided through an edge application and may include information about a type of the service, a service usage time, the amount of traffic generated due to usage of the service, a location of a UE using the service, etc.

The CM package 360 is a set of instructions for determining the number of SCs included in the vRAN package (e.g., vRAN package 342) or MEC package (e.g., MEC package 352) and resources allocated to SCs in the vRAN package (e.g., vRAN package 342), or an HC for performing MEC functions or vRAN functions. The CM package 360 may include an interface (IF) 362 and a CM SC 364. The IF 362 may receive traffic processing information from a vRAN package (e.g., vRAN package 344) and MEC service usage information from a MEC package (e.g., MEC package 354). As another example, the IF 362 may obtain, from an external device, information about an event expected to cause a change in traffic or MEC service usage. An event causes a change in traffic generated in a plurality of BSs.

The CM SC 364 may obtain, based on the traffic processing information and the MEC service usage information, information about the amount of traffic and amount of MEC service usage to be generated by UEs accessing the BSs 12, 14, and 16. Information about traffic expected to occur due to the UEs accessing the BSs 12, 14, and 16 is information directly or indirectly indicating the amount and characteristics of traffic expected to be generated in the BSs 12, 14, and 16 due to the access by the UEs. For example, the information about traffic expected to be generated in the BSs 12, 14, and 16 may include an expected traffic processing speed per cell (e.g., in bps), the number of UEs expected to be connected to a BS, a bandwidth expected to be allocated to the BS, a frequency sharing ratio between different wireless communication technologies, etc. As another example, the information about traffic expected to be generated in the BSs 12, 14, and 16 may include a type of a service expected to generate the traffic, a frequency band in which the traffic is expected to be generated, a type of a wireless communication system (e.g., a NR or LTE system) where the traffic is expected to be generated, etc.

Furthermore, information about the amount of MEC service usage expected to be generated by the UEs accessing the BSs 12, 14, and 16 may include information about a time when an edge application is to be executed at the UEs, the amount of traffic to be generated due to the execution of the edge application, a location of a UE at which the edge application is to be executed, etc.

As another example, as information about an event causing a change in traffic or MEC service usage ("event information") is obtained, the event being expected to occur in the BSs 12, 14, and 16, the CM SC 364 may identify the amount of traffic and amount of MEC service usage previously generated for each event. The CM SC 364 may determine, based on the identified amount of traffic and amount of MEC service usage previously generated for each event, the amount of traffic and amount of MEC service usage to be generated in the BSs 12, 14, and 16 according to the obtained event information.

Furthermore, the CM SC 364 may determine, based on the determined amount of traffic and amount of MEC service usage, at least one HC on which an SC for virtualizing an NF in the server 300 is to be executed. For example, when the CM SC 364 determines, based on the MEC service usage information, that the amount of MEC service usage will increase rapidly at a particular point A in the future, the CM SC 364 may offload processing of traffic generated by MEC services to the GPU 314 and the FPGA 313 in order to increase the processing speed of the MEC services. Moreover, the CM SC 364 may determine that vRAN functions are to be performed by the CPU 311 because both the GPU 314 and the FPGA 313 are used to process the MEC services at the particular time point A. Furthermore, after determining that the vRAN functions are to be performed by the CPU 311, the CM SC 364 may then determine information about the number of vRAN packages and resources allocated to each of the vRAN packages based on information about traffic to be generated. The CM SC 364 may transmit the determined information about the vRAN package to a virtualization master 370, and the virtualization master 370 may transmit a command to adjust the vRAN package according to the received information about the vRAN package. In addition, the CM SC 364 may transmit a command to perform MEC functions to the GPU 314 and FPGA 313 that are to perform the MEC functions.

However, this is merely an example, and the CM SC 364 may determine the number of SCs in software for performing an NF, resources allocated to an SC, and a type of an HC on which the software is to be executed, based on the amount of traffic expected to be generated, a type of the traffic, required performance for traffic processing, etc. A detailed description thereof will be given below with reference to FIG. 4.

Operation and maintenance (O&M) 380 may transmit a command to the EIU 50 to allocate traffic generated in the BSs 12, 14, and 16 to each vRAN package by taking into account the adjusted vRAN package. Accordingly, traffic received from at least one of the BSs 12, 14, and 16 may be newly allocated to the adjusted vRAN package.

Figure 4:
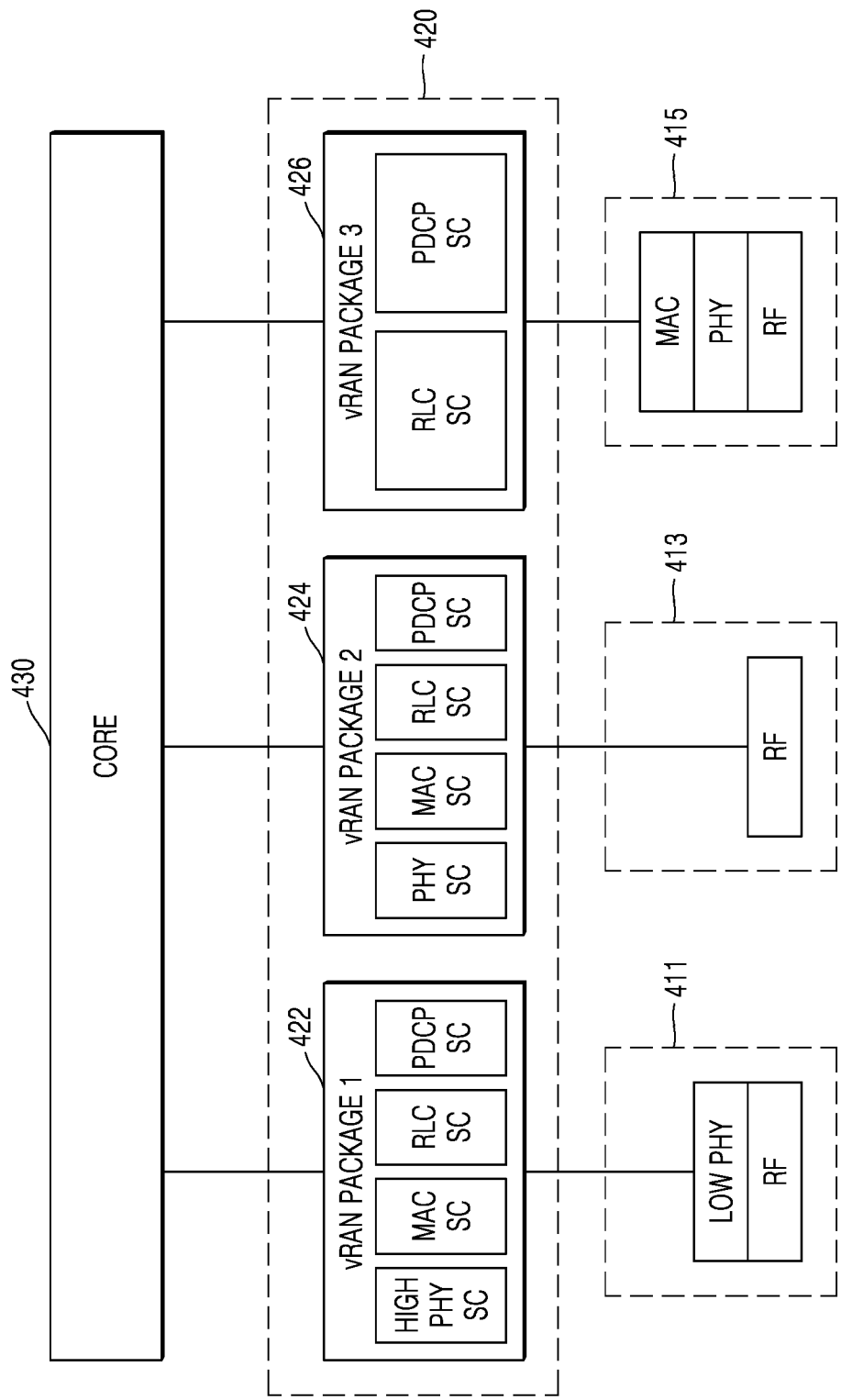
FIG. 4 is a diagram illustrating example RAN functions that are to be executed in a server, according to various embodiments.

FIG. 4 is a diagram illustrating example RAN functions that are to be executed in a server 420, according to various embodiments.

Referring to FIG. 4, an SC that performs at least some of the RAN functions performed by an existing integrated BS may be executed in the server 420. Here, the RAN functions may include PHY layer functions, MAC layer functions, RLC layer functions, and PDCP layer functions, and in particular, the PHY layer functions are further subdivided into a low PHY layer functions and a high PHY layer functions. However, these are merely examples, and other layer functions may be each further subdivided into several types.

A splitting point at which the RAN functions are split may be determined based on the amount of traffic that the server 420 is able to accommodate, the performance of a fronthaul connecting each of a plurality of BSs, i.e., first through third BSs 411, 413, and 415, to the server 420, the performance of a backhaul connecting the server 420 to a core network device 430, etc., and RAN functions that may be executed in the server 420 according to various embodiments of the disclosure will be described in more detail below.

In a vRAN according to an embodiment of the disclosure, when the amount of traffic generated in a BS (e.g., the first BS 411) at a cell site is greater than a traffic capacity of the fronthaul connecting the BS (e.g., the first BS 411) at the cell site to the server 420, a delay or loss may occur in a process of transmitting traffic to the server 420 due to congestion on the fronthaul. In this case, to reduce a load on the fronthaul, unlike in the embodiment of the disclosure described above with reference to FIG. 3, the PHY layer functions may be divided such that a LOW PHY layer function 440 may be executed in the first BS 411 at the cell site. Accordingly, vRAN package 1 422 may be executed on the server 420, the vRAN package 1 422 including a High PHY SC 442 for performing a High PHY layer function, a MAC SC 444 for performing a MAC layer function, a RLC SC 446 for performing a RLC layer function, and a PDCP SC 448 for performing a PDCP layer function. The BS 411 may include an RF device 450.

According to another example embodiment of the disclosure, in the vRAN, when a traffic capacity of the fronthaul is greater than the amount of traffic generated in an actual BS (e.g., the second BS 413), and a traffic processing capability of the server 420 is higher than a preset level, vRAN package 2 424 may be executed on the server 420, the vRAN package 2 424 including a PHY SC 452 for performing a PHY layer function, a MAC SC 454 for performing a MAC layer function, a RLC SC 456 for performing a RLC layer function, and a PDCP SC 458 for performing a PDCP layer function. In this case, the second BS 413 at the cell site may include an RF device 460.

According to another example embodiment of the disclosure, in the vRAN, when a traffic capacity of the fronthaul is extremely low, vRAN package 3 426 may be executed on the server 420, the vRAN package 3 426 including an RLC SC 462 for performing an RLC layer function and a PDCP SC 464 for performing a PDCP layer function. In this case, the third BS 415 at the cell site may include an RF device 466, a PHY device 468 for performing a PHY layer function, and a MAC device 470 for performing a MAC layer function. In this embodiment of the disclosure, because the third BS 415 at the cell site performs relatively many RAN functions, the load on the fronthaul may be reduced.

Moreover, vRAN packages having various structures as described above with reference to FIG. 4 may be used as a vRAN package to be executed on the server 300 described above with reference to FIG. 3. In this case, as described above with reference to FIG. 3, a type of hardware on which a vRAN package is to be executed may be determined based on traffic processing information and MEC service usage information.

Figure 5:
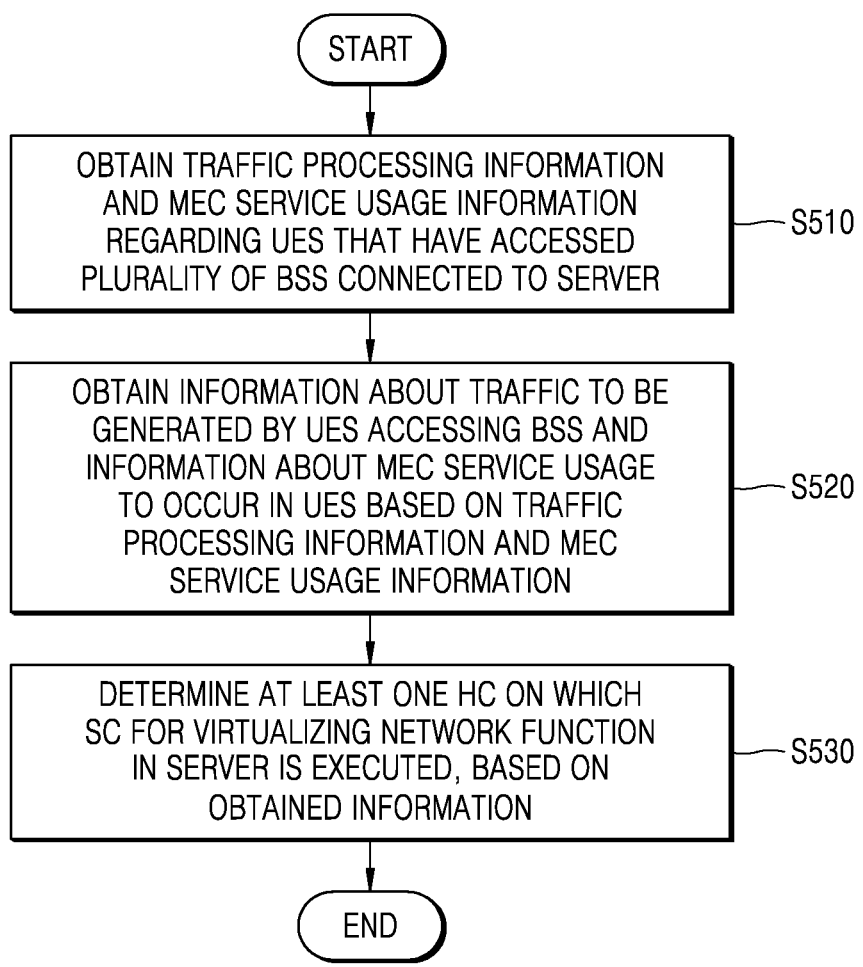
FIG. 5 is a flowchart illustrating an example method, performed by a server, of performing offloading of a network function, according to various embodiments.

FIG. 5 is a flowchart illustrating an example method, performed by a server, of performing offloading of a network function, according to various embodiments.

The server may obtain traffic processing information and MEC service usage information regarding UEs that have accessed a plurality of BSs connected to the server (operation S510).

According to various embodiments, the server may identify, from the traffic processing information, information about the amount of traffic generated in each of at least one time interval. For example, the server may identify the amount of traffic generated 1 week ago or 10 minutes ago. According to another example, the server may identify, based on the traffic processing information, the amount of traffic generated in a plurality of BSs for each wireless communication system, or as another example, the server may identify the amount of traffic generated in the BSs for each time-frequency resource region. However, these are merely examples, and as another example, the server may identify resources used for traffic processing based on the traffic processing information. For example, the server may identify the amount of RAM, the number of CPU cores, etc. used to process particular traffic. Furthermore, the server may identify, based on the MEC service usage information, the amount of MEC service usage generated in each of the at least one time interval. As another example, the server may identify the amount of MEC service usage generated for each time-frequency resource region or physical location.

According to various embodiments, to receive traffic processing information and MEC service usage information from a plurality of BSs, the server may request the traffic processing information and the MEC service usage information from the BSs. According to another embodiment, the server may periodically receive traffic processing information and MEC service usage information from a plurality of BSs without requesting the same from the BSs. According to another embodiment, the server may receive traffic processing information and MEC service usage information from a core network device. However, these are merely examples, and the method used by the server to obtain traffic processing information and MEC service usage information is not limited to the above-described examples. As another example, the server may receive traffic processing information and MEC service usage information directly from a user.

The server may obtain, based on the traffic processing information and the MEC service usage information, information about the amount of traffic and amount of MEC service usage to be generated by the UEs accessing the BSs (operation S520).

According to various embodiments, the server may respectively identify, based on the received traffic processing information and MEC service usage information, a pattern of traffic and a pattern of MEC service usage that have occurred in the BSs. The pattern of traffic is a type of change in the amount of traffic with respect to location and time, and the pattern of MEC service usage is a type of change in the amount of MEC service usage with respect to location and time.

According to another embodiment of the disclosure, the server may identify a pattern of traffic and a pattern of MEC service usage by using a pre-generated artificial intelligence (AI) model. The pre-generated AI model may include at least one layer, and parameters of each of nodes included in the at least one layer may be set via training based on traffic processing information, MEC service usage information, and event information.

The server may obtain, based on the identified pattern of traffic and pattern of MEC service usage information, information about the amount of traffic and amount of MEC service usage to be generated in the BSs. The server may predict that the amount of traffic or amount of MEC service usage will increase above or decrease below a threshold at a particular time.

The server may determine, based on the obtained information, at least one HC on which an SC for virtualizing an NF in the server is to be executed (operation S530).

The server may determine a type of HC on which an SC virtualizing an NF for providing traffic and MEC services is to be executed based on the amounts of traffic and MEC service usage expected to be generated at a particular time point, required performance for traffic processing, etc. An NF is a function of transferring traffic between devices on a network and processing generated traffic, and may include, for example, a RAN function and a MEC function.

After determining the at least one HC, the server may control each SC to be executed on a corresponding HC. Hardware offloading is an operation of transferring a task of an HC on which an SC for virtualizing an NF is executed to another HC. Furthermore, scaling is an operation of adjusting at least one of the number of SCs or the amount of resources allocated to an SC, and in this disclosure, an operation of increasing the amount of resources allocated to an SC may be referred to as scale-up while an operation of reducing the amount of resources allocated to the SC may be referred to as scale-down. In addition, an operation of increasing the number of SCs may be referred to as scale-out, and an operation of reducing the number of SCs may be referred to as scale-in. The scale-up, scale-down, scale-out, and scale-in may be collectively referred to as scaling.

For example, when it is determined that an SC for virtualizing RAN functions is executed by a CPU and an SC for virtualizing MEC functions is executed by a GPU, the server may control, based on the determination, the CPU and the GPU to respectively execute the SC for virtualizing the RAN functions and the SC for virtualizing the MEC functions. As another example, when both the SC for virtualizing the RAN functions and the SC for virtualizing the MEC functions were previously executed by a CPU, the server may perform offloading so that the MEC functions executed by the CPU are executed by a GPU. However, these are merely examples, and the server may perform a scaling operation according to the determination.

According to various embodiments, when the amount of MEC service usage or the amount of traffic is not greater than a corresponding threshold, the server may process MEC services or traffic through a scaling operation. However, when the amount of MEC service usage or the amount of traffic is greater than the threshold, hardware offloading may be performed because it is difficult to process the MEC services and traffic only with the scaling operation while satisfying requirements for each service.

Moreover, the server may preset a criterion (or criteria) for determining whether to perform a scaling operation or hardware offloading. Here, the criterion may include the amount of traffic, a ratio of the amount of traffic processed via the MEC services to the total amount of traffic, required performance for traffic processing, etc.

First, the server may respectively determine the amount of traffic and amount of MEC service usage that need to be processed per unit time, based on the amount of traffic and amount of MEC service usage predicted to be generated. For example, based on the amount of MEC service usage predicted to be generated being greater than or equal to a certain percentage of a total amount of traffic, the server may determine to process the MEC services on a GPU or FPGA supporting a high processing speed. Furthermore, as the server determines to process the MEC services on the GPU or the FPGA, the server may determine to process a relatively small amount of vRAN traffic on a CPU.

For example, based on the amount of traffic predicted to be generated at a first time point being A or more, and the amount of traffic that needs to be processed using the MEC services with respect to the total amount of traffic being 70% or more, the server may perform hardware offloading so that MEC functions are performed on the GPU or FPGA supporting a higher processing speed than the CPU. Furthermore, based on the MEC functions being determined to be performed on the GPU or FPGA, the server may allow vRAN functions to be performed on an HC other than the GPU or FPGA. Accordingly, the server allows the vRAN functions to be processed on the CPU that was responsible for processing the vRAN functions, and when the amount of traffic in a vRAN is predicted to increase below a threshold, the server may process an increased amount of traffic through a scaling operation. In particular, based on the amount of traffic being A or more, the server may determine that traffic processing is not to be performed smoothly only by adjusting the amount of resources allocated to an existing vRAN package and thus increase the number of vRAN packages via scale-out.

However, these are merely examples, and the method used by the server to determine an HC on which an SC for virtualizing an NF is to be executed is not limited to the above-described examples. In the above-described situation, even in a case where the MEC services are processed on the GPU and the FPGA, a bottleneck may occur when processing of traffic is delayed in the vRAN that is a lower layer. Accordingly, based on the amount of MEC service usage being N times greater than the amount of traffic, the server may determine to process the MEC services on the GPU and the FPGA while processing vRAN traffic on the CPU. Based on the amount of MEC service usage being at least M times greater than, but less than N times greater than the amount of traffic, the server may determine to process the MEC services on the FPGA while processing the vRAN traffic on the GPU and the CPU. As another example, based on the GPU being virtualized, the server may use 70% of resources for the virtualized GPU to process the MEC services and 30% of the resources to perform the vRAN functions.

However, the above-described examples are merely illustrative, and the method of determining at least one of an SC for virtualizing an NF in the server or an HC is not limited to these examples.

FIG. 6 is a diagram illustrating an example method, performed by a server, of determining an HC on which an SC for performing vRAN functions is to be executed as the amount of traffic is expected to increase, according to various embodiments.

Referring to FIG. 6, the server may drive an SC for virtualizing an NF via hardware 610 included in the server. In detail, an OS may be run on the hardware 610 and manage the hardware 610 and a virtualization software 620. The hardware 610 includes CPU 611, FPGA 613, GPU 615, and NIC 617. Descriptions of the hardware 610, the OS, and the virtualization software 620 correspond to those described above with reference to FIG. 3, and thus will be omitted here.

In order to describe a method of determining an HC on which an SC for virtualizing each of a vRAN function and a MEC function is to be executed based on traffic processing information and MEC service usage information regarding UEs, the operations of each software described with reference to FIG. 3 are now described in more detail.

A vRAN package 630 may receive traffic generated in a BS 10. A PHY SC 631, a MAC SC 632, and a RLC SC 633 included in the vRAN package 630 may respectively perform PHY layer functions, MAC layer functions, and RLC layer functions on the received traffic. The vRAN package 630 may transmit traffic processing information to a CM package 650.

Furthermore, among the traffic received by the vRAN package 630, traffic generated due to execution of an application using MEC services may be transmitted to an MEC package 640. Traffic not related to use of the MEC services among the traffic received by the vRAN package 630 may be transmitted to another server (not shown in FIG. 6) outside the server, and a description of a method of processing traffic at another server outside the server will be omitted here.

The MEC package 640 may process the traffic generated by the MEC services after receiving it from the vRAN package 630. Furthermore, the MEC package 640 may provide MEC service usage information to the CM package 650. The MEC package 640 may include an edge enabler SC 641 and a plurality of edge app SCs 642 and 643, and a description thereof will be omitted here because the description corresponds to that described above with reference to FIG. 2. The MEC package 640 may transmit, to the CM package 650, the MEC service usage information including information about a type of an MEC service, an MEC service usage time, the amount of traffic generated due to usage of the MEC service, etc., the information being obtained during the traffic processing. In an example embodiment, the MEC services may be, for example, services provided by Internet of Things (IoT) devices and wearable devices in the home, but this is merely an example, and the MEC services are not limited thereto.

The CM package 650 may include an IF 651 and a CM SC 652. The CM SC 652 may obtain, based on the traffic processing information and the MEC service usage information received via the IF 651, information about the amount of traffic and amount of MEC service usage to be generated by UEs accessing the BS 10.

The CM SC 652 may obtain, based on the traffic processing information and the MEC service usage information, information about the amount of traffic and amount of MEC service usage to be generated by UEs accessing the BS 10. For example, in the FIG. 6 embodiment, the CM SC 652 may predict, based on the number of UEs that have accessed the BS 10 at each time interval on each day of the week and a type of an application used by each of the UEs at that time interval, that the amount of traffic will increase above a threshold A due to an increase in the number of smartphone users (as shown on the right side of FIG. 6) at a time interval between t1 and t2 every Monday, and the amount of MEC service usage to be generated at that time interval will be less than X % of the total amount of traffic.

As the amount of traffic is predicted to increase above the threshold A, in order to increase a traffic processing speed, the CM SC 652 may determine to perform hardware offloading so that the vRAN package 630 previously executed by a CPU 611 is executed on the GPU 615 before the time interval between t1 and t2 every Monday. Because the GPU 615 has a preset function stored in its application programming interface (API) for traffic processing, the GPU 615 may process traffic faster based on the preset function. Accordingly, the CM SC 652 may control instructions constituting the vRAN package 630 so that the vRAN package 630 may be executed on the GPU 615, as described in more detail below with reference to FIG. 10. Virtualization master 660 may transmit a command to adjust the vRAN package. However, the hardware offloading operation is merely an example, and the CM SC 652 may set an HC on which the vRAN package 630 is to be executed according to the amount of traffic predicted to be generated. An operation of performing offloading to an HC other than the GPU 615 will be described in detail below with reference to FIGS. 7, 8 and 9.

Figure 7:
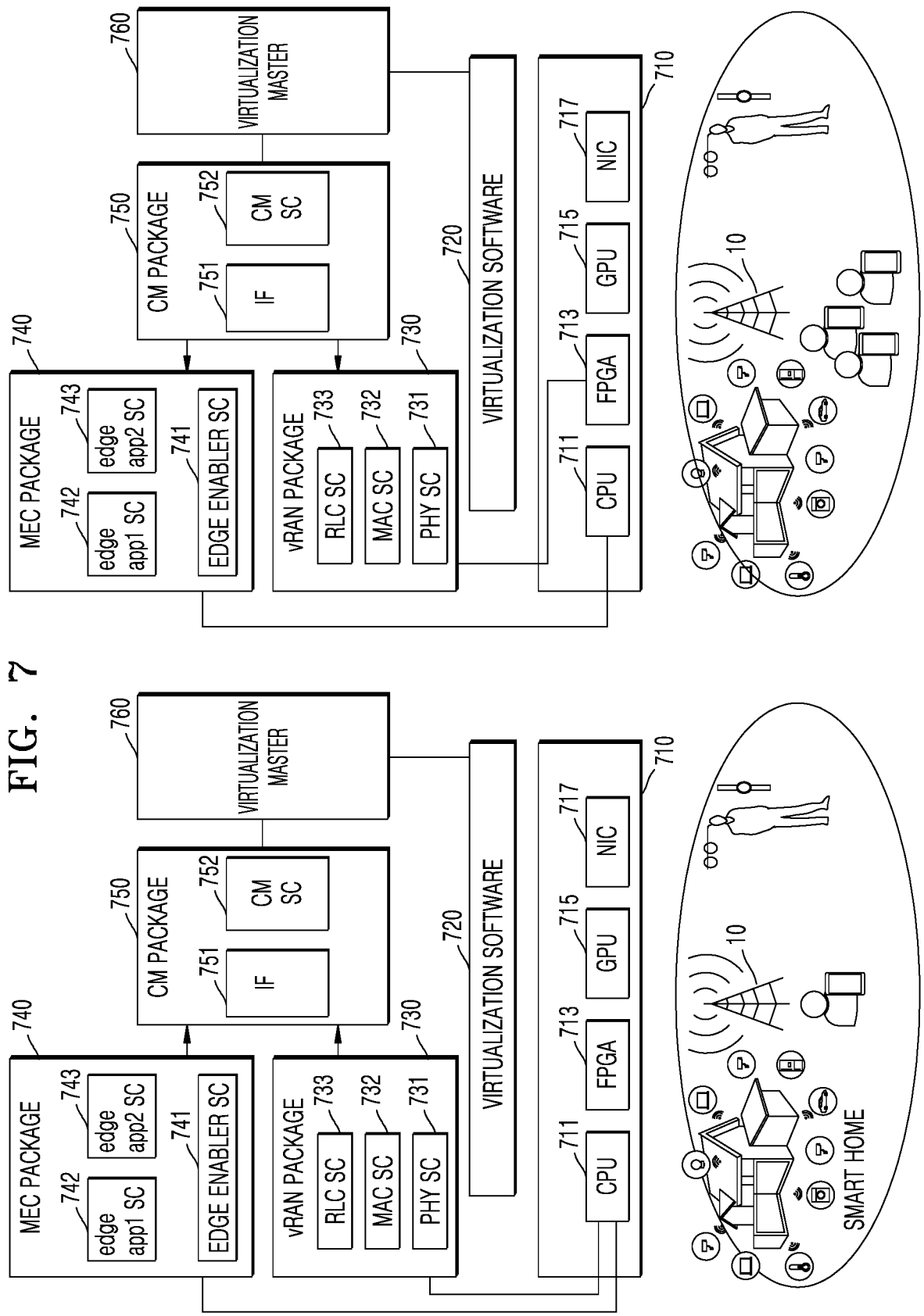
FIG. 7 is a diagram illustrating an example method, performed by a server, of determining an HC on which an SC for performing vRAN functions is to be executed as the amount of traffic is expected to increase, according to various embodiments.

FIG. 7 is a diagram illustrating an example method, performed by a server, of determining an HC on which an SC for performing vRAN functions is to be executed as the amount of traffic is expected to increase, according to various embodiments.

Referring to FIG. 7, the server may drive an SC for virtualizing an NF via hardware 710 included in the server. In detail, an OS may be run on the hardware 710 and manage the hardware 710 and a virtualization software 720. The hardware 710 includes CPU 711, FPGA 713, GPU 715, and NIC 717. Descriptions of the hardware 710, the OS, and the virtualization software 720 correspond to those described above with reference to FIG. 3, and thus will be omitted here.

In order to describe a method of determining an HC on which an SC for virtualizing each of a vRAN function and a MEC function is to be executed based on traffic processing information and MEC service usage information regarding UEs, the operations of each software described with reference to FIG. 3 are now described in more detail.

A vRAN package 730 may receive traffic generated in a BS 10. A PHY SC 731, a MAC SC 732, and a RLC SC 733 included in the vRAN package 630 may respectively perform PHY layer functions, MAC layer functions, and RLC layer functions on the received traffic. The vRAN package 730 may transmit traffic processing information to a CM package 750.

Furthermore, among the traffic received by the vRAN package 730, traffic generated due to execution of an application using MEC services may be transmitted to a MEC package 740. Traffic not related to use of the MEC services among the traffic received by the vRAN package 730 may be transmitted to another server (not shown in FIG. 7) outside the server, and a description of a method of processing traffic at another server outside the server will be omitted here.

The MEC package 740 may process the traffic generated by the MEC services after receiving it from the vRAN package 730. Furthermore, the MEC package 740 may provide MEC service usage information to the CM package 750. The MEC package 740 may include an edge enabler SC 741 and a plurality of edge app SCs 742 and 743, and a description thereof will be omitted here because the description corresponds to that described above with reference to FIG. 2. The MEC package 740 may transmit, to the CM package 750, the MEC service usage information including information about a type of a MEC service, a MEC service usage time, the amount of traffic generated due to usage of the MEC service, etc., the information being obtained during the traffic processing. In an example embodiment, the MEC services may be, for example, services provided by IoT devices and wearable devices in the home, but this is merely an example, and the MEC services are not limited thereto.

The CM package 750 may include an IF 751 and a CM SC 752. The CM SC 752 may obtain, based on the traffic processing information and the MEC service usage information received via the IF 751, information about the amount of traffic and amount of MEC service usage to be generated by UEs accessing the BS 10.

The CM SC 752 may obtain, based on the traffic processing information and the MEC service usage information, information about the amount of traffic and amount of MEC service usage to be generated by UEs accessing the BS 10. For example, as shown in FIG. 7, the CM SC 752 may predict, based on the number of UEs accessing the BS 10 at each time interval on each day of the week and a type of an application used by each of the UEs at that time interval, that the amount of traffic to be generated will be in a range from B to A, which is a critical range, due to an increase in the number of smartphone users (shown on the right side of FIG. 7) at a time interval between t3 and t4 every Friday, and the amount of MEC service usage to be generated at that time interval will be less than X % of the total amount of traffic.

As the amount of traffic to be generated is predicted to be in the range from B to A, in order to increase a traffic processing speed, the CM SC 752 may determine to perform hardware offloading so that the vRAN package 730 previously executed by CPU 711 is executed on FPGA 713 before the time t3 every Friday. The FPGA 713 is capable of operating at low power while providing a high parallel computational speed for traffic processing according to a program algorithm. Thus, the FPGA 713 may be more cost-efficient than a GPU 715 specialized for parallel computation although it has a lower computational speed than the GPU 715. As described above, when the amount of traffic exceeds A, the CM SC 752 may perform hardware offloading so that the vRAN package 730 is executed on the GPU 715. However, according to the example embodiment of FIG. 7, when the amount of traffic to be generated is predicted to be in the range from B to A, the CM SC 752 may perform hardware offloading so that the vRAN package 730 is executed on the FPGA 713 that operates at relatively low power. Virtualization master 760 may transmit a command to adjust the vRAN package.

According to various embodiments, as described above, as the amount of traffic and the amount of MEC service usage predicted to be generated are determined, the server may determine an HC on which the vRAN package 730 and the MEC package 740 are each to be executed by taking into account traffic processing performance of HCs. In particular, the server may determine an HC on which the vRAN package 730 and the MEC package 740 are each to be executed to satisfy a latency, a throughput, etc., by taking into account the required performance specifications for an application or MEC services that generated the traffic.

Figure 8:
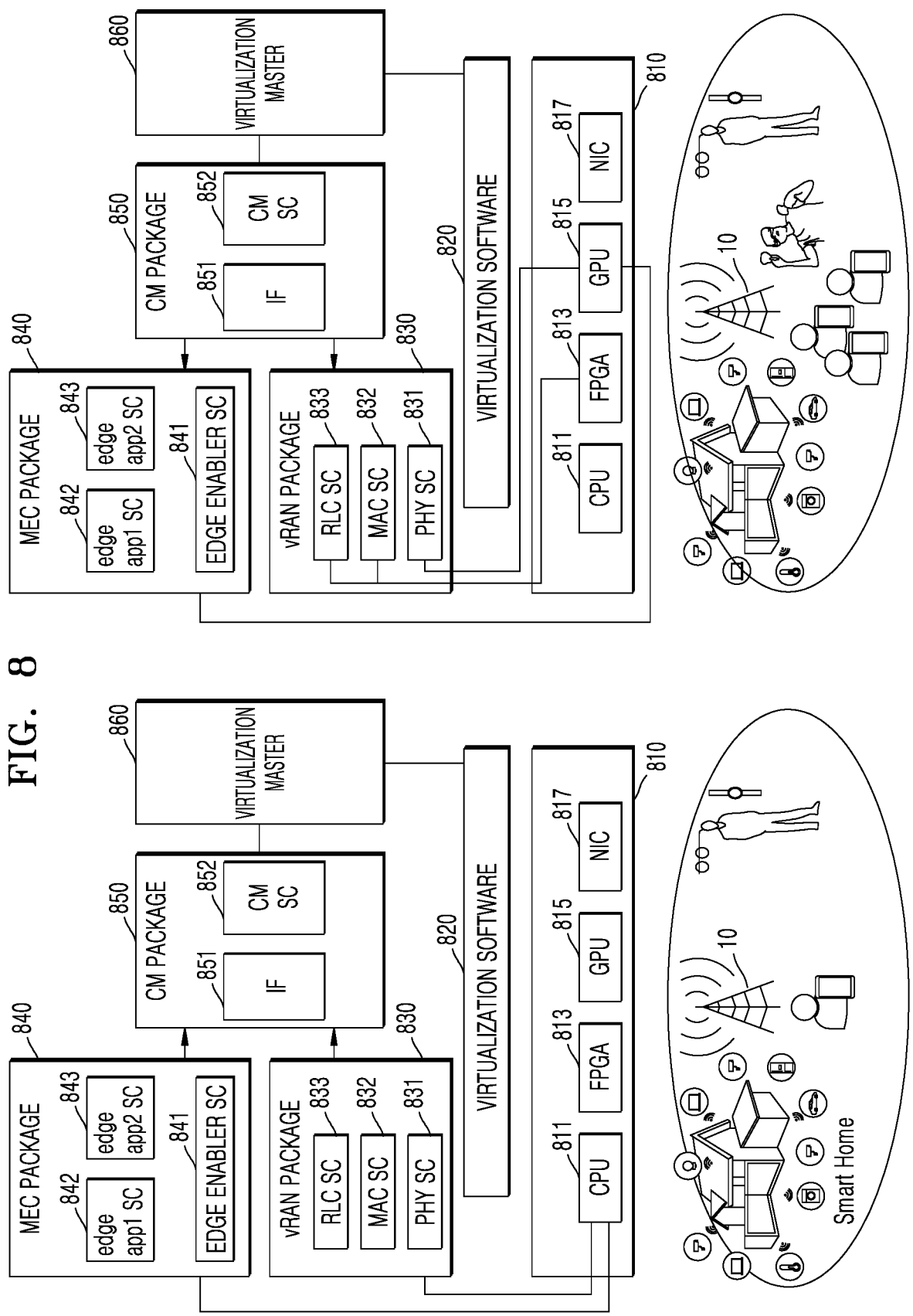
FIG. 8 is a diagram illustrating an example method, performed by a server, of determining an HC on which an SC for performing vRAN functions and an SC for performing MEC functions are each to be executed as the amount of traffic and the amount of MEC service usage are expected to increase, according to various embodiments.

FIG. 8 is a diagram illustrating an example method, performed by a server, of determining an HC on which an SC for performing vRAN functions and an SC for performing MEC functions are each to be executed as the amount of traffic and the amount of MEC service usage are expected to increase, according to various embodiments.

Referring to FIG. 8, the server may drive an SC for virtualizing an NF via hardware 810 included in the server. In detail, an OS may be run on the hardware 810 and manage the hardware 810 and a virtualization software 820. The hardware 810 includes CPU 811, FPGA 813, GPU 815, and NIC 817. Descriptions of the hardware 810, the OS, and the virtualization software 820 correspond to those described above with reference to FIG. 3, and thus will be omitted here.

In order to describe a method of determining an HC on which an SC for virtualizing each of a vRAN function and a MEC function is to be executed based on traffic processing information and MEC service usage information regarding UEs, the operations of each software described with reference to FIG. 3 are now described in more detail.

A vRAN package 830 may receive traffic generated in a BS 10. A PHY SC 831, a MAC SC 832, and a RLC SC 833 included in the vRAN package 830 may respectively perform PHY layer functions, MAC layer functions, and RLC layer functions on the received traffic. The vRAN package 830 may transmit traffic processing information to a CM package 850.

Furthermore, among the traffic received by the vRAN package 830, traffic generated due to execution of an application using MEC services may be transmitted to a MEC package 840. Traffic not related to use of the MEC services among the traffic received by the vRAN package 830 may be transmitted to another server (not shown in FIG. 8) outside the server, and a description of a method of processing traffic at another server outside the server will be omitted here.

The MEC package 840 may process the traffic generated by the MEC services after receiving it from the vRAN package 830. Furthermore, the MEC package 840 may provide MEC service usage information to the CM package 850. The MEC package 840 may include an edge enabler SC 841 and a plurality of edge app SCs 842 and 843, and a description thereof will be omitted here because the description corresponds to that described above with reference to FIG. 2. The MEC package 840 may transmit, to the CM package 850, the MEC service usage information including information about a type of an MEC service, an MEC service usage time, the amount of traffic generated due to usage of the MEC service, etc., the information being obtained during the traffic processing. In an example embodiment, the MEC services may be, for example, services provided by IoT devices and wearable devices in the home, but this is merely an example, and the MEC services are not limited thereto.

The CM package 850 may include an IF 851 and a CM SC 852. The CM SC 852 may obtain, based on the traffic processing information and the MEC service usage information received via the IF 851, information about the amount of traffic and amount of MEC service usage to be generated by UEs accessing the BS 10.

The CM SC 852 may obtain, based on the traffic processing information and the MEC service usage information, information about the amount of traffic and amount of MEC service usage to be generated by the UEs accessing the BS 10. The BS 10 may identify the amount of traffic processed and the amount of MEC service usage for each preset time unit based on the obtained information. Furthermore, the BS 10 may predict, based on the amount of processed traffic and amount of MEC service usage identified for each time unit, the amount of traffic and amount of MEC service usage to be generated at a particular time point. For example, the CM SC 852 may predict that the amount of traffic to be generated will exceed a threshold A due to increases in the number of smartphone users and the number of virtual reality (VR)/augmented reality (AR) service users (as shown on the right side of FIG. 8) at a time interval between t5 and t6, and the amount of MEC service usage to be generated at that time interval will be in a range from D to C according to the increase in the number of VR/AR service users.

The CM SC 852 may determine, according to the amount of traffic and amount of MEC service usage predicted to increase, an HC on which the vRAN package 830 and the MEC package 840 are each to be executed by taking into account a performance requirement specification, traffic processing performance of HCs, etc. For example, as VR/AR services that have caused an increase in the amount of MEC service usage requires an ultra-low latency specification compared to other services, the CM SC 852 may determine an HC on which the MEC package 840 is to be executed as a GPU 815 so as to minimize a delay that occurs during processing of traffic associated with the VR/AR services. Furthermore, when the MEC package 840 was previously executed on hardware other than the GPU 815, the CM SC 852 may perform a series of hardware offloading processes for changing the other hardware to the GPU 815. Virtualization master 860 may transmit a command to adjust the vRAN package.

In the embodiment of the disclosure of FIG. 8, as the amount of traffic as well as the amount of MEC service usage is predicted to exceed a threshold, hardware offloading of the vRAN package 830 may be determined. Moreover, when hardware offloading to the GPU 815 is required for fast processing in the vRAN package 830 as well, the CM SC 852 may determine which of the vRAN package 830 and the MEC package 840 is an SC that is to be executed on the GPU 815. The SC to be executed on the GPU 815 may be determined based on preset priorities or according to a performance specification required by an application and MEC services that generated traffic. However, this is merely an example, and as another example, when an HC is virtualized, the CM SC 852 may determine that the vRAN package 820 and the MEC package 840 are simultaneously executed on the HC at a preset ratio. In this case, the preset ratio may be determined in a manner corresponding to the priorities.

In the example embodiment of FIG. 8, when the MEC services have more stringent latency requirements than other services, the CM SC 852 may allow all functions of the MEC package 840 to be executed on the GPU 815, and a region in the GPU 815 not used for execution of the MEC package 840 may be used to execute the vRAN package 830.

Moreover, the CM SC 852 may determine that a function determined to require a relatively large amount of computation among various functions performed by the vRAN package 830 according to the type of traffic is to be executed on the GPU 815. For example, when the number of smartphone users increases in the coverage of the BS 10, the amount of computation by the PHY SC 831 may increase due to an increase in the amount of computation during beamforming. Accordingly, the CM SC 852 may determine that the PHY SC 831 is to be executed on the GPU 815. Furthermore, the CM SC 852 may determine that the MAC SC 832 and RLC SC 833 determined to perform a relatively small amount of computation are to be executed on FPGA 813. The FPGA 813 is able to operate at low power while providing a high parallel computational speed for traffic processing according to a program algorithm. Thus, the FPGA 813 may be more cost-efficient than the GPU 815 specialized for parallel computation although it has a lower computational speed than the GPU 815.

Figure 9:
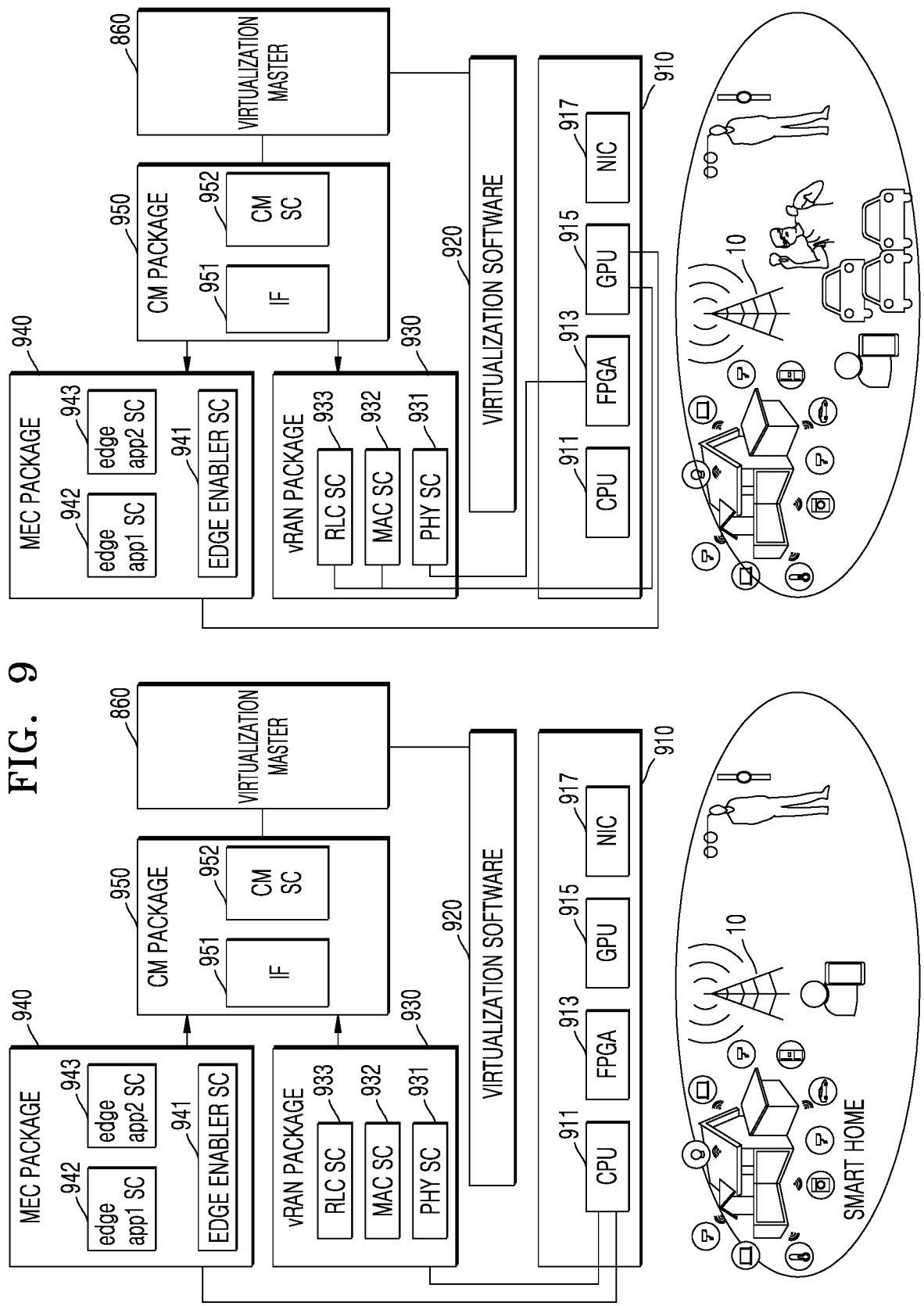
FIG. 9 is a diagram illustrating an example method, performed by a server, of determining an HC on which an SC for performing vRAN functions and an SC for performing MEC functions are each to be executed as the amount of traffic and the amount of MEC service usage are expected to increase, according to various embodiments.

FIG. 9 is a diagram illustrating an example method, performed by a server, of determining an HC on which an SC for performing vRAN functions and an SC for performing MEC functions are each to be executed as the amount of traffic and the amount of MEC service usage are expected to increase, according to various embodiments.

Referring to FIG. 9, the server may drive an SC for virtualizing an NF via hardware 910 included in the server. In detail, an OS may be run on the hardware 910 and manage the hardware 910 and a virtualization software 920. The hardware 910 includes CPU 911, FPGA 913, GPU 915, and NIC 917. Descriptions of the hardware 910, the OS, and the virtualization software 920 correspond to those described above with reference to FIG. 3, and thus will be omitted here.

In order to describe a method of determining an HC on which an SC for virtualizing each of a vRAN function and a MEC function is to be executed based on traffic processing information and MEC service usage information regarding UEs, the operations of each software described with reference to FIG. 3 are now described in more detail.

A vRAN package 930 may receive traffic generated in a BS 10. A PHY SC 931, a MAC SC 932, and a RLC SC 933 included in the vRAN package 930 may respectively perform PHY layer functions, MAC layer functions, and RLC layer functions on the received traffic. The vRAN package 930 may transmit traffic processing information to a CM package 950.

Furthermore, among the traffic received by the vRAN package 930, traffic generated due to execution of an application using MEC services may be transmitted to a MEC package 940. Traffic not related to use of the MEC services among the traffic received by the vRAN package 930 may be transmitted to another server (not shown in FIG. 9) outside the server, and a description of a method of processing traffic at another server outside the server will be omitted here.

The MEC package 940 may process the traffic generated by the MEC services after receiving it from the vRAN package 930. Furthermore, the MEC package 940 may provide MEC service usage information to the CM package 950. The MEC package 940 may include an edge enabler SC 941 and a plurality of edge app SCs 942 and 943, and a description thereof will be omitted here because the description corresponds to that described above with reference to FIG. 2. The MEC package 940 may transmit, to the CM package 950, the MEC service usage information including information about a type of a MEC service, a MEC service usage time, the amount of traffic generated due to usage of the MEC service, etc., the information being obtained during the traffic processing. In an example embodiment, the MEC services may be, for example, services provided by IoT devices and wearable devices in the home, but this is merely an example, and the MEC services are not limited thereto.

The CM package 950 may include an IF 951 and a CM SC 952. The CM SC 952 may obtain, based on the traffic processing information and the MEC service usage information received via the IF 951, information about the amount of traffic and amount of MEC service usage to be generated by UEs accessing the BS 10.

The CM SC 952 may obtain, based on the traffic processing information and the MEC service usage information, information about the amount of traffic and amount of MEC service usage to be generated by the UEs accessing the BS 10. The BS 10 may identify the amount of traffic processed and the amount of MEC service usage for each preset time unit based on the obtained information. Furthermore, the BS 10 may predict, based on the amount of processed traffic and amount of MEC service usage identified for each time unit, the amount of traffic and amount of MEC service usage to be generated at a particular time point. For example, the CM SC 952 may predict that the amount of traffic will exceed a threshold A due to increases in the number of smartphone users and the number of VR/AR service users (shown on right side of FIG. 9) at a time interval between t7 and t8, and the amount of MEC service usage to be generated at that time interval will exceed D according to the increase in the number of VR/AR service users.

The CM SC 952 may determine, according to the amount of traffic and amount of MEC service usage predicted to increase, an HC on which the vRAN package 930 and the MEC package 940 are each to be executed by taking into account a performance requirement specification, traffic processing performance of HCs, etc. For example, as VR/AR services that have caused an increase in the amount of MEC service usage requires an ultra-low latency specification compared to other services, the CM SC 952 may determine an HC on which the MEC package 940 is to be executed as GPU 915 so as to minimize a delay that occurs during processing of traffic associated with the VR/AR services. Furthermore, when the MEC package 940 was previously executed on hardware other than the GPU 915, the CM SC 952 may perform a series of hardware offloading processes for changing the other hardware to the GPU 915. Virtualization master 960 may transmit a command to adjust the vRAN package.

In the example embodiment of FIG. 9, as the amount of traffic as well as the amount of MEC service usage is predicted to exceed a threshold, hardware offloading of the vRAN package 930 may be determined. Moreover, when hardware offloading to the GPU 915 is required for fast processing in the vRAN package 930 as well, the CM SC 952 may determine which of the vRAN package 930 and the MEC package 940 is an SC that is to be executed on the GPU 915. The SC to be executed on the GPU 915 may be determined based on preset priorities or according to a performance specification required by an application and MEC services that generated traffic. However, this is merely an example, and as another example, when an HC is virtualized, the CM SC 952 may determine that the vRAN package 930 and the MEC package 940 are simultaneously executed on the HC at a preset ratio. In this case, the preset ratio may be determined in a manner corresponding to the priorities.

In the example embodiment of FIG. 9, when the MEC services have more stringent latency requirements than other services, the CM SC 952 may allow all functions of the MEC package 940 to be executed on the GPU 915, and a region in the GPU 915 not used for execution of the MEC package 940 may be used to execute the vRAN package 930.

Moreover, the CM SC 952 may determine that a function determined to require a relatively large amount of computation among various functions performed by the vRAN package 930 according to the type of traffic is to be executed on the GPU 915. For example, when the number of UEs using V2X services increases in the coverage of the BS 10 (as shown on the right side of FIG. 9), the amount of computation by the MAC SC 932 may increase due to an increase in the amount of computation for a handover procedure, etc. Accordingly, the CM SC 952 may determine that the MAC SC 932 is to be executed on the GPU 915. Furthermore, the CM SC 952 may determine that the PHY SC 931 and RLC SC 933 determined to perform a relatively small amount of computation are to be executed on an FPGA 913. The FPGA 913 is able to operate at low power while providing a high parallel computational speed for traffic processing according to a program algorithm. Thus, the FPGA 913 may be more cost-efficient than the GPU 915 specialized for parallel computation although it has a lower computational speed than the GPU 915.

Figure 10:
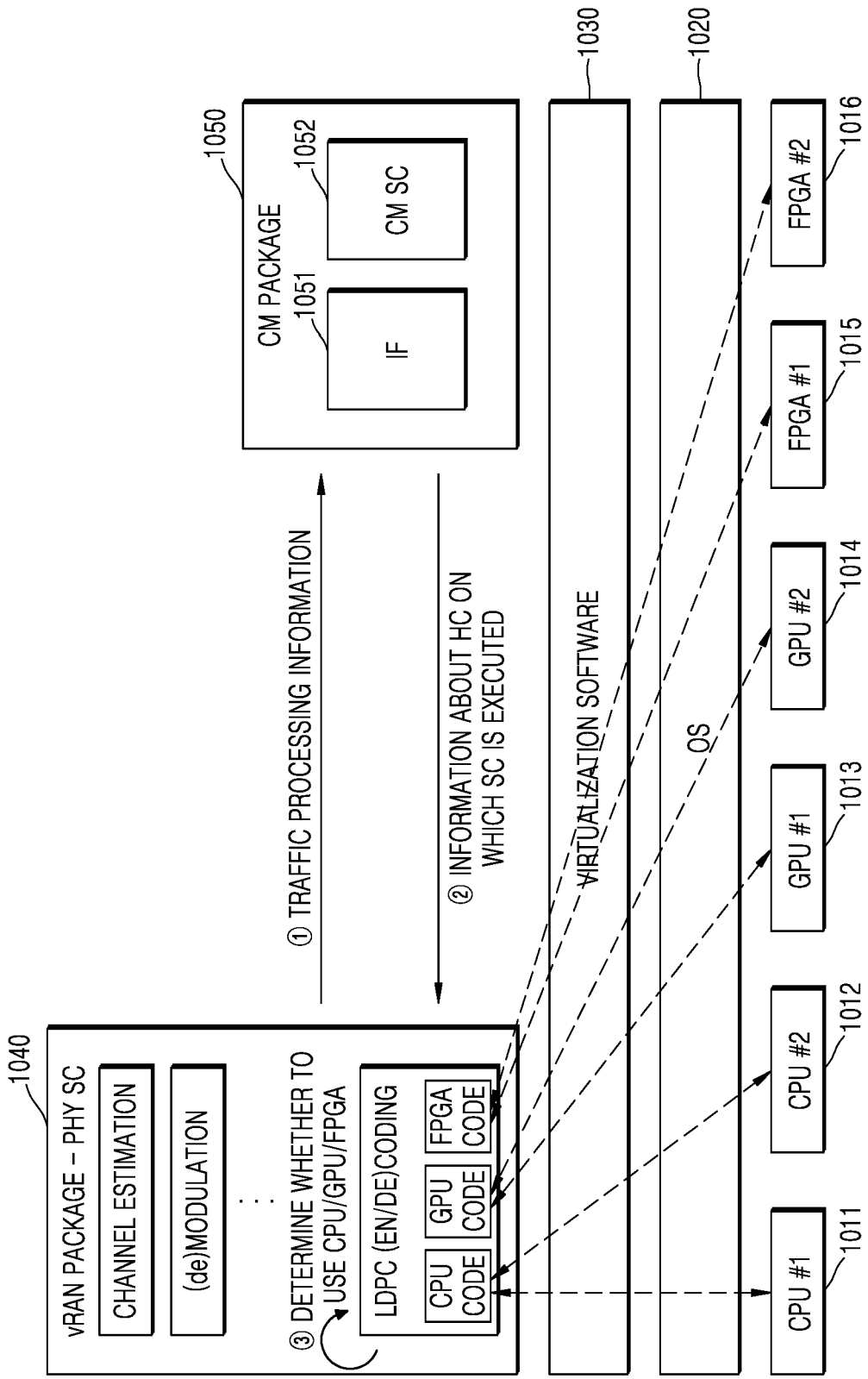
FIG. 10 is a diagram illustrating an example method of executing an SC for performing a VNF on an HC, according to various embodiments.

FIG. 10 is a diagram illustrating an example method of executing an SC for performing a VNF on an HC, according to various embodiments.

Referring to FIG. 10, a server may drive an SC for virtualizing an NF via hardware included in the server. The hardware may include a plurality of CPUs 1011 and 1012, a plurality of GPUs 1013 and 1014, and a plurality of FPGAs 1015 and 1016. Furthermore, an OS 1020 may be run on the hardware and manage the hardware and a virtualization software 1030.

FIG. 10 shows a PHY SC 1040 of a vRAN package as an example of an SC for performing a VNF. The PHY SC 1040 may perform channel estimation 1060, modulation or demodulation 1062, and a precoding function such as low density parity check (LDPC) coding 1064, etc.

Traffic processing information may be transmitted from the vRAN package to a CM package 1050. See operation 1. Moreover, the CM package 1050 may include an IF 1051 and a CM SC 1052, and the IF 1051 may transmit the traffic processing information received from the vRAN package to the CM SC 1052. The CM SC 1052 may determine, based on the traffic processing information, information about HCs on which SCs in the vRAN package are to be respectively executed. Although FIG. 10 shows only traffic processing information as an example of information used by the CM SC 1052 to determine an HC, as described above with reference to FIGS. 3, 4, 5, 6, 7, 8, and 9, the CTM SC 1052 may determine an HC on which each of the SCs in the vRAN package is to be executed by taking into account MEC service usage information together with the traffic processing information.

As an HC on which the PHY SC 1040 in the vRAN package is to be executed is determined, the CM package 1050 may transmit information about the determined HC to the PHY SC 1040. See operation 2. The PHY SC 1040 may include instructions for performing functions of a PHY layer, and the instructions may be respectively stored in the form of CPU code, GPU code, and FPGA code. The PHY SC 1040 may be executed using the CPU code, the GPU code, and/or the FPGA code, as noted by operation 3. For example, based on the PHY SC 1040 receiving information indicating that the HC is determined as a CPU from the CM package 1050, the PHY SC 1040 may be executed on the CPU (e.g., 1011) through execution of an instruction in the form of CPU code. As another example, based on the PHY SC 1040 receiving information indicating that the HC is determined as a GPU from the CM package 1050, the PHY SC 1040 may be executed on the GPU (e.g., 1013) through execution of an instruction in the form of GPU code. As another example, based on the PHY SC 1040 receiving information indicating that the HC is determined as an FPGA from the CM package 1050, the PHY SC 1040 may be executed on the FPGA (e.g., 1015) through execution of an instruction in the form of FPGA code.

Figure 11:
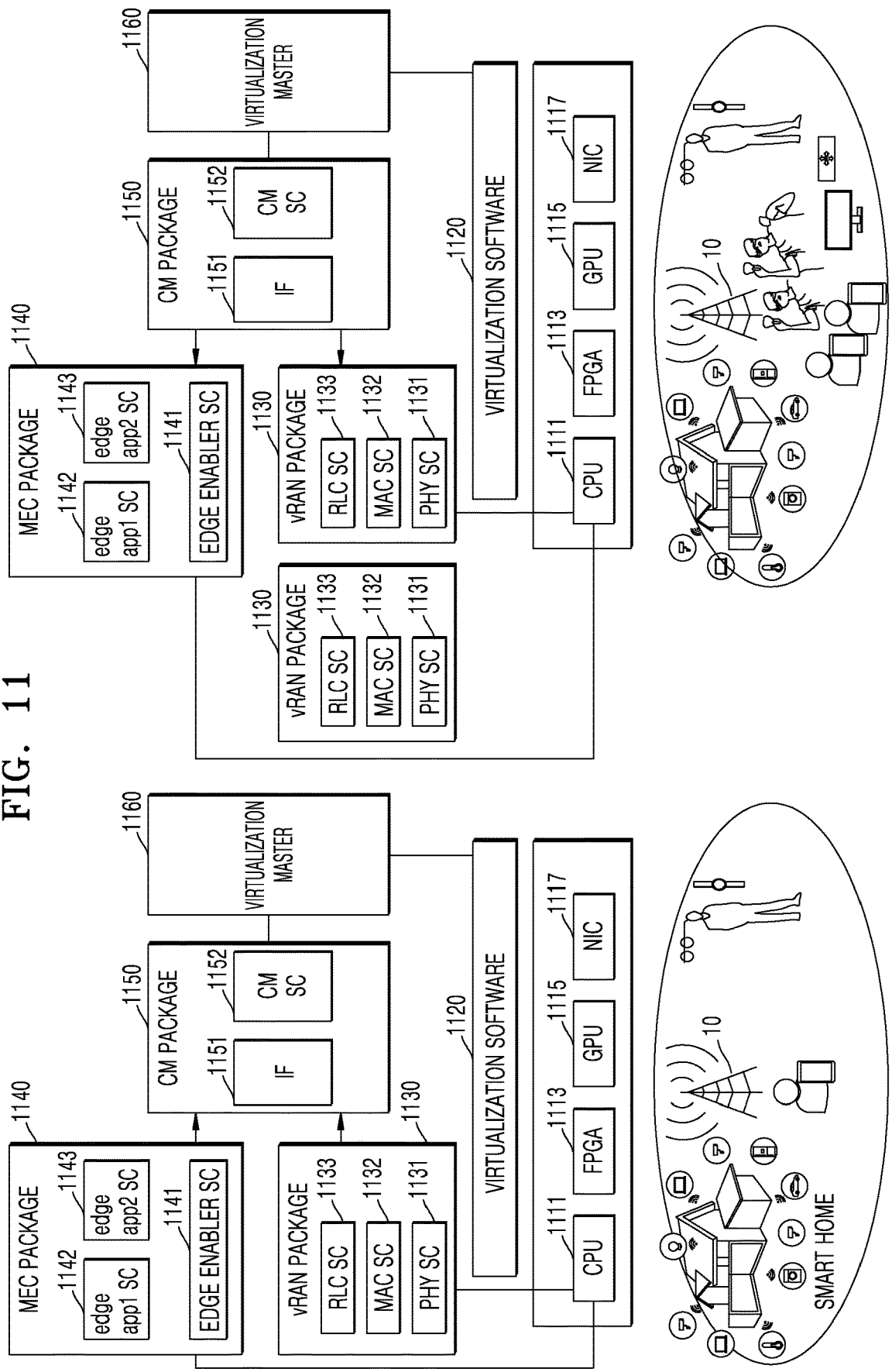
FIG. 11 is a diagram illustrating an example method, performed by a server, of executing an SC for performing vRAN functions and an SC for performing MEC functions as the amount of traffic and the amount of MEC service usage are expected to increase, according to various embodiments.

FIG. 11 is a diagram illustrating an example method, performed by a server, of executing an SC for performing vRAN functions and an SC for performing MEC functions as the amount of traffic and the amount of MEC service usage are expected to increase, according to various embodiments;

Referring to FIG. 11, the server may drive an SC for virtualizing an NF via hardware 1110 included in the server. In detail, an OS may be run on the hardware 1110 and manage the hardware 1110 and a virtualization software 1120. The hardware 1110 includes CPU 1111, FPGA 1113, GPU 1115, and NIC 1117. Descriptions of the hardware 1110, the OS, and the virtualization software 1120 correspond to those described above with reference to FIG. 3, and thus will be omitted here.

In order to describe a method of determining an HC on which an SC for virtualizing each of a vRAN function and a MEC function is to be executed based on traffic processing information and MEC service usage information regarding UEs, the operations of each software described with reference to FIG. 3 are now described in more detail.

A vRAN package 1130 may receive traffic generated in a BS 10. A PHY SC 1131, a MAC SC 1132, and a RLC SC 1133 included in the vRAN package 1130 may respectively perform PHY layer functions, MAC layer functions, and RLC layer functions on the received traffic. The vRAN package 1130 may transmit traffic processing information to a CM package 1150.

Furthermore, among the traffic received by the vRAN package 1130, traffic generated due to execution of an application using MEC services may be transmitted to an MEC package 1140. Traffic not related to use of the MEC services among the traffic received by the vRAN package 930 may be transmitted to another server (not shown in FIG. 11) outside the server, and a description of a method of processing traffic at another server outside the server will be omitted here.

The MEC package 1140 may process the traffic generated by the MEC services after receiving it from the vRAN package 1130. Furthermore, the MEC package 1140 may provide MEC service usage information to the CM package 1150. The MEC package 1140 may include an edge enabler SC 1141 and a plurality of edge app SCs 1142 and 1143, and a description thereof will be omitted here because the description corresponds to that described above with reference to FIG. 2. The MEC package 1140 may transmit, to the CM package 1150, the MEC service usage information including information about a type of an MEC service, an MEC service usage time, the amount of traffic generated due to usage of the MEC service, etc., the information being obtained during the traffic processing. In an example embodiment, the MEC services may be, for example, services provided by IoT devices and wearable devices in the home, but this is merely an example, and the MEC services are not limited thereto.

The CM package 1150 may include an IF 1151 and a CM SC 1152. The CM SC 1152 may obtain, based on the traffic processing information and the MEC service usage information received via the IF 1151, information about the amount of traffic and amount of MEC service usage to be generated by UEs accessing the BS 10.

The CM SC 1152 may obtain, based on the traffic processing information and the MEC service usage information, information about the amount of traffic and amount of MEC service usage to be generated by the UEs accessing the BS 10. The BS 10 may identify the amount of traffic processed and the amount of MEC service usage for each preset time unit based on the obtained information. Furthermore, the BS 10 may predict, based on the amount of processed traffic and amount of MEC service usage identified for each time unit, the amount of traffic and amount of MEC service usage to be generated at a particular time point. For example, the CM SC 1152 may predict that the amount of traffic will be in a critical range of A to B due to increases in the number of smartphone users, the number of VR/AR service users, and the number of streaming service users (as shown on the right side of FIG. 11) at a time interval between t9 and t10, and the amount of MEC service usage to be generated at that time interval will exceed D according to the increases in the number of VR/AR service users and the number of streaming service users.

The CM SC 1152 may determine, according to the amount of traffic and amount of MEC service usage predicted to increase, an HC on which the vRAN package 1130 and the MEC package 1140 are each to be executed by taking into account a performance requirement specification, traffic processing performance of HCs, etc. For example, as VR/AR services and streaming services that have caused an increase in the amount of MEC service usage require ultra-low latency specifications compared to other services, the CM SC 1152 may determine an HC on which the MEC package 1140 is to be executed as a GPU 1115 so as to minimize delays that occur during processing of traffic associated with the VR/AR services and the streaming services.

Moreover, in the embodiment of the disclosure of FIG. 11, as not only the amount of MEC service usage but also the amount of traffic is predicted to increase, it is necessary to increase the amount of traffic to be processed by the vRAN package 1130. However, in the embodiment of the disclosure of FIG. 11, when the degree to which the amount of traffic increases is less than or equal to a threshold, a scale-out operation for increasing the number of vRAN packages may be performed instead of performing hardware offloading. Accordingly, the CM SC 1150 may request a virtualization master 1160 to increase the number of vRAN packages. As the virtualization master 1160 requests the virtualization software 1120 to increase the number of vRAN packages 1130, a plurality of vRAN packages may be obtained. In this case, the vRAN packages may be executed by a CPU 1111. However, this is merely an example, and the CM SC 1150 may determine an HC on which a plurality of vRAN packages are to be executed as an FPGA or the like according to the amount of traffic predicted to increase.

Figure 12:
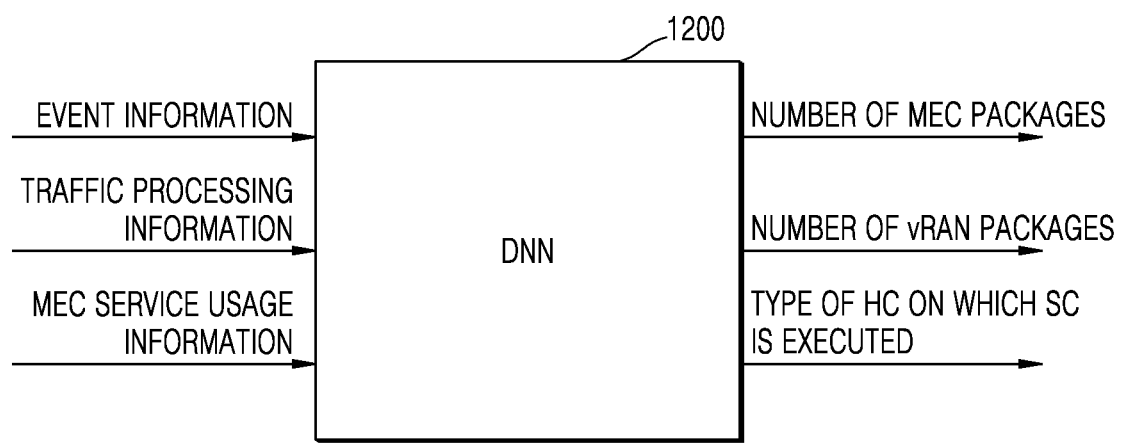
FIG. 12 is a diagram illustrating an example artificial intelligence (AI) model used for determining an HC on which an SC for virtualizing an NF is to be executed, according to various embodiments.

FIG. 12 is a diagram illustrating an example AI model 1200 (e.g., a deep neural network (DNN) model) used for determining an HC on which an SC for virtualizing an NF is to be executed, according to various embodiments.

Referring to FIG. 12, event information, traffic processing information, and MEC service usage information may be applied to the AI model 1200 as input data. The server described above with reference to FIG. 3 may train the AI model 1200 based on a result of comparing evaluation data and output data obtained as a result of applying the above-described input data to the AI model 1200. For example, the server may apply various pieces of input data to the AI model 1200 until a difference between the output data and the evaluation data becomes less than a preset threshold. As another example, the server may train the AI model 1200 by applying the difference between the output data and the evaluation data to the AI model 1200 together with the input data. Values of parameters at each layer constituting a neural network of the AI model 1200 may be modified and refined through the training. However, this is merely an example, and a method of training an AI model is not limited to the above-described example.

According to an embodiment of the disclosure, the server may obtain information about the number of MEC packages, the number of vRAN packages, and a type of HC on which an SC is executed by inputting, to the trained AI model 1200, newly obtained event information, traffic processing information, and MEC service usage information.

FIG. 13 is a signal flow diagram illustrating example operations of a server 1340 for processing traffic between a plurality of UEs 1310 and a BS 1320 via adjustment for an SC, according to various embodiments.

Traffic may be generated between the UEs 1310 and the BS 1320 (operation S1352). As described above with reference to FIG. 3, traffic is a flow of data passing through a communication network within a certain time. In an example embodiment, traffic may be generated between the UEs 1310 and the BS 1320 to exchange information for achieving a particular purpose (e.g., usage of a particular service).

The BS 1320 may transmit the traffic to an EIU 1330 (operation S1354). The EIU 1330 is a part of a passage connecting the server 1340 to a plurality of BSs (including the BS 1320) at a cell site.

The EIU 1330 may transmit the traffic to an SC of a preset vRAN package in the server 1340 (operation S1356). Information about a BS allocated to each of at least one vRAN package generated in the server 1340 may be preset in the EIU 1330.

The server 1340 may obtain traffic processing information and MEC service usage information (operation S1358). The server 1340 may obtain the traffic processing information and the MEC service usage information by, for example, monitoring the traffic transmitted to a vRAN package from each of the BSs (including the BS 1320) via the EIU 1330.

Because operation S1358 corresponds to operation S510 described above with reference to FIG. 5, descriptions that are already provided above with respect to operation S510 will be omitted here.

The server 1340 may obtain, based on the traffic processing information and the MEC service usage information, information about the amount of traffic and amount of MEC service usage to be generated by UEs accessing a plurality of BSs (operation S1360).

Because operation S1360 corresponds to operation S520 described above with reference to FIG. 5, descriptions that are already provided above with respect to operation S520 will be omitted here.

The server 1340 may determine, based on the obtained information, an HC on which an SC for virtualizing an NF is to be executed, the amount of resources allocated to the SC, or the number of SCs (operation S1362). According to an example embodiment, the server 1340 may compare each of the amount of traffic and amount of MEC service usage to be generated by the UEs at a particular time point with at least one preset threshold. The server 1340 may change, based on a result of the comparison, an HC on which an SC of a vRAN package and an SC of an MEC package are each to be performed, or the number of vRAN packages or MEC packages and resources allocated to each of the vRAN and MEC packages.

The server 1340 may transmit a command to the EIU 1330 to allocate traffic to be generated in the BS 1320 based on the determination (operation S1364). For example, when a vRAN package is newly created or removed, and accordingly, a BS allocated to each vRAN package is changed in operation S1362, the server 1340 may transmit, to the EIU 1330, BS allocation information for each changed vRAN package. Furthermore, when the amount of resources allocated to the SC is changed in step S1362, the server 1340 may transmit information about the SC having the changed amount of resources to the EIU 1330. However, these are merely examples, and when the amount of resources allocated to the SC is changed or a type of the HC on which the SC is executed is changed, the server 1340 may not transmit information about this change to the EIU 1330.

Traffic may be generated between the UEs 1310 and the BS 1320 (operation S1366). In an example embodiment, although it has been described for convenience that traffic is generated after an SC in the server 1340 has been adjusted, this is merely an example, and the example embodiments ae not limited to traffic being generated after the SC has been adjusted.

The BS 1320 may transmit the traffic to the EIU 1330 (operation S1368).

The EIU 1330 may transmit the traffic to the adjusted SC according to the command received in operation S1364 (operation S1370). For example, when a vRAN package is newly created in the server 1340 and a command is received to allocate the BS 1320 to the newly created vRAN package, the EIU 1330 may transmit the traffic to an SC of the newly created vRAN package.

Each of the components in the diagrams herein may be integrated, added, or omitted according to a specification of a device that is actually implemented. In other words, two or more components may be combined into a single component, or a single component may be split into two or more components when necessary. Furthermore, functions performed in each block are intended to describe non-limiting, example embodiments of the disclosure, and a specific operation or apparatus related to the functions does not limit the scope of the disclosure.

The methods according to the various example embodiments described in the appended claims or specification thereof may be implemented in hardware, software, or a combination of hardware and software.

When the methods are implemented in software, a computer-readable storage medium storing at least one program (software module) may be provided. The at least one program stored in the computer-readable storage medium is configured for execution by at least one processor within an electronic device. The at least one program includes instructions that cause the electronic device to execute the methods according to the various embodiments described in the claims or specification thereof.

The program (software module or software) may be stored in random access memory (RAM), non-volatile memory including a flash memory, read-only memory (ROM), electrically erasable programmable ROM (EEPROM), a magnetic disc storage device, compact disc-ROM (CD-ROM), digital versatile discs (DVDs) or other types of optical storage devices, and a magnetic cassette. Alternatively, the program may be stored in a memory that is configured as a combination of some or all of the memories. Furthermore, a plurality of such memories may be included.

Furthermore, the program may be stored in an attachable storage device that may be accessed through a communication network such as the Internet, Intranet, a local area network (LAN), a wide LAN (WLAN) or a storage area network (SAN) or a communication network configured in a combination thereof. The storage device may access a device performing methods according to the embodiments of the disclosure via an external port. Furthermore, a separate storage device on a communication network may also access a device performing the methods according to the various embodiments of the disclosure.

In specific example embodiments of the disclosure, a component included in the disclosure is expressed in a singular or plural form depending on the specific embodiments of the disclosure. However, singular or plural expressions are selected to be suitable for the presented situations for convenience of description, and the disclosure is not limited to the singular or plural form. An element expressed in a plural form may be configured as a single element, or an element expressed in a singular form may be configured as a plurality of elements.

The various example embodiments of the disclosure described in the present specification and the accompanying drawings have been provided only as particular examples in order to easily describe technical features in the disclosure and assist in understanding the disclosure and are not intended to limit the scope of the disclosure. In other words, it will be apparent to those of ordinary skill in the art that other modifications may be implementable based on the technical spirit of the disclosure. Moreover, the embodiments of the disclosure may be combined with each other for operation when necessary. For example, an embodiment of the disclosure may be combined with parts of other embodiments of the disclosure to operate a BS and a UE. Other modifications based on the technical spirit of the embodiments of the disclosure may be implementable by various systems such as an LTE frequency division duplex (FDD) system, an LTE time division duplex (TDD) system, a 5G or NR system, etc.

What is claimed is:

1. A method, performed by a server, of executing a virtualized network function in a wireless communication system, the method comprising:

obtaining traffic processing information and mobile edge computing (MEC) service usage information regarding a plurality of user equipments (UEs) that have accessed to the server via a plurality of base stations, wherein the traffic processing information includes traffic information indicating an amount of traffic occurred on a virtualized random access network, vRAN, function and resource information indicating physical resources including hardware components used for processing the traffic;

identifying an amount of MEC service usage based on the traffic processing information and the MEC service usage information;

predicting an amount of traffic to occur and an amount of MEC service usage to occur based on the amount of the traffic occurred on the vRAN function and the amount of the MEC service usage; and determining, based on the predicted amount of the traffic and the predicted amount of the MEC service usage, a type of the physical resource on which each of a software component for the vRAN function and an MEC function in the server is to be executed.

2. The method of claim 1, wherein identifying the amount of the MEC service usage comprises:
identifying, based on the traffic processing information and the MEC service usage information, the amount of MEC service usage for each preset time unit.

3. The method of claim 1, wherein the determining the type of the physical resource comprises:
comparing each of the amount of traffic and the amount of MEC service usage predicted to occur at particular time point with at least one preset threshold; and
determining, based on a result of the comparing, the type of the physical resources on which each of the software component for the vRAN function and the MEC function is to be executed.

4. The method of claim 3, wherein the determining the type of the physical resources comprises:
based on a same hardware component beings determined for each of the vRAN function and the MEC function, determining priorities of the vRAN function and the MEC function based on required performance in the wireless communication system; and
determining, based on the determined priorities, the type of the physical resource on which the vRAN function or the MEC function is to be executed.

5. The method of claim 4, further comprising, when a hardware component determined for each of the vRAN function and the MEC function is a virtualized hardware component, determining, based on the priorities, a ratio of the hardware component in which each of the vRAN function or the MEC function is to be executed.

6. The method of claim 1, wherein the determining the type of the physical resources comprises:
Based on at least one of an amount of traffic or an amount of MEC service usage predicted to occur being in a first range, determining a hardware component on which the software component is to be executed as a graphics processing unit (GPU); and
based on at least one of the amount of traffic or the amount of MEC service usage predicted to occur being in a second range, determining a hardware component on which the software component is to be executed as a field programmable gate array (FPGA).

7. The method of claim 1, further comprising, when at least one of the amount of traffic or the amount of MEC service usage predicted to occur at a particular time point is identified to exceed a threshold, performing hardware offloading before the particular time point so that the software component executed on a first hardware component is to be executed on a second hardware component.

8. The method of claim 1, further comprising obtaining information about a plurality of events causing a change in the traffic or the MEC service usage, predicted to occur,
wherein predicting the traffic to occur and the MEC service usage to occur comprises:
identifying an amount of traffic and an amount of MEC service usage previously predicted for each event; and
determining, based on the identified amount of traffic and amount of MEC service usage previously predicted for each event, an amount of traffic and an amount of MEC service usage to occur for one of the events.

9. The method of claim 1, wherein the hardware components includes at least one of a central processing unit (CPU), a GPU, an FPGA, or a network interface controller (NIC).

10. A server for executing a virtualized network function in a wireless communication system, the server comprising:
a memory storing one or more instructions; and
at least one processor configured to execute the one or more instructions stored in the memory to:
obtain traffic processing information and mobile edge computing (MEC) service usage information regarding user equipments (UEs) that have accessed to the server via a plurality of base stations, wherein the traffic processing information includes traffic information indicating an amount of traffic occurred on a virtualized random access network, vRAN, function and resource information indicating physical resources including hardware components used for processing the traffic,
identify an amount of MEC service usage based on the traffic processing information and the MEC service usage information,
predict, an amount of traffic to occur and an amount of MEC service usage to occur based on the amount of the traffic occurred on the vRAN function and the amount of the MEC service usage, and
determine, based on the predicted amount of the traffic and the predicted amount of the MEC service usage, a type of the physical resources on which each of a software component for the vRAN function and an MEC function in the server is to be executed.

11. The server of claim 10, wherein the at least one processor is further configured to execute the one or more instructions to:
identify, based on the traffic processing information and the MEC service usage information, the amount of MEC service usage for each preset time unit.

12. The server of claim 10, wherein the at least one processor is further configured to execute the one or more instructions to:
compare each of the amount of traffic and the amount of MEC service usage predicted to occur at a particular time point with at least one preset threshold; and
determine, based on a result of the comparing, the type of the physical resources on which each of the software component for the vRAN function and the MEC function is to be executed.

13. The server of claim 12, wherein the at least one processor is further configured to execute the one or more instructions to:
when a same hardware component is determined for each of the vRAN function and the MEC function, determine priorities of the vRAN function and the MEC function based on required performance in the wireless communication system; and
determine, based on the determined priorities, the type of the physical resource on which the vRAN function or the MEC function is to be executed.

14. The server of claim 13, wherein the at least one processor is further configured to execute the one or more instructions to, when a hardware component determined for each of the vRAN function and the MEC function is a virtualized hardware component, determining, based on the priorities, a ratio of the hardware component in which each of the vRAN function or the MEC function is to be executed.

15. The server of claim 10, wherein the at least one processor is further configured to execute the one or more instructions to:

based on at least one of an amount of traffic or an amount of MEC service usage predicted to occur being in a first range, determine a hardware component on which the software component is to be executed as a graphics processing unit (GPU); and based on at least one of the amount of traffic or the amount of MEC service usage predicted to occur being in a second range, determine a hardware component on which the software component is to be executed as a field programmable gate array (FPGA).

16. The server of claim 10, wherein the at least one processor is further configured to execute the one or more instructions to, when at least one of the amount of traffic or the amount of MEC service usage predicted to occur at a particular time point is identified to exceed a threshold, perform hardware offloading before the particular time point so that the software component executed on a first hardware component is executed on a second hardware component.

17. The server of claim 10, wherein the at least one processor is further configured to execute the one or more instructions to:

obtain information about a plurality of events causing a change in the traffic or the MEC service usage, which is predicted to occur;

identify an amount of traffic and an amount of MEC service usage previously generated for each event; and determine, based on the identified amount of traffic and amount of MEC service usage previously generated for each event, an amount of traffic and an amount of MEC service usage predicted to occur for one of the events.

18. The server of claim 10, wherein the hardware components include at least one of a central processing unit (CPU), a GPU, an FPGA, or a network interface controller (NIC).

19. A computer program product comprising a non-transitory computer-readable recording medium having stored therein a program which causes a server to perform a method of executing a virtualized network function, the method comprising:

obtaining traffic processing information and mobile edge computing (MEC) service usage information regarding a plurality of user equipments (UEs) that have accessed to the server via a plurality of base stations, wherein the traffic processing information includes traffic information indicating an amount of traffic occurred on a virtualized random access network, vRAN, function and resource information indicating physical resources including hardware components used for processing the traffic, identifying an amount of MEC service usage based on the traffic processing information and the MEC service usage information;

predicting an amount of traffic to occur and an amount of MEC service usage to occur based on the amount of the traffic occurred on the vRAN function and the amount of the MEC service usage; and determining, based on the predicted amount of the traffic and the predicted amount of the MEC service usage a type of the physical resources on which each of a software component for the vRAN function and an MEC function in the server is to be executed.

* * * * *